(12) United States Patent
Teal et al.

(10) Patent No.: US 6,257,357 B1
(45) Date of Patent: Jul. 10, 2001

(54) STEERING DEVICE FOR DRIVE AND STEER TRANSMISSION

(75) Inventors: Richard Donald Teal, Horicon; Eugene Gary Hayes, Beaver Dam; David Lewis Marchese, Pewaukee; Barry Joseph Goebert, Beaver Dam, all of WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/277,418

(22) Filed: Mar. 26, 1999

(51) Int. Cl.$^7$ .............................. B62D 6/00; B62K 11/00
(52) U.S. Cl. .......................... 180/6.2; 280/211; 280/98
(58) Field of Search ....................... 280/211, 98, 93.513, 280/93.514; 180/6.2

(56) References Cited

U.S. PATENT DOCUMENTS

| Re. 34,057 | 9/1992 | Middlesworth | 180/6.2 |
|---|---|---|---|
| 2,332,838 | 10/1943 | Borgward | 180/9.2 |

(List continued on next page.)

FOREIGN PATENT DOCUMENTS

| 0 806 337 A1 | 12/1997 | (EP) . |
|---|---|---|
| WO 98/32645 | 7/1998 | (JP) . |
| 2000-25637 | 1/2000 | (JP) . |
| 2000-25638 | 1/2000 | (JP) . |
| 2000-25639 | 1/2000 | (JP) . |
| WO 00/01569 | 1/2000 | (WO) . |
| WO 00/19127 | 4/2000 | (WO) . |

OTHER PUBLICATIONS

English translation by Japanese Patent Office of Japanese publication 2000025637, date of publication—Jan. 25, 2000, 24 pages, title—Steering and Driving Device for Traveling Vehicle.

English abstract of Japanese Publication 2000025638 dated Jan. 25, 2000, on page, title—Steering and Driving Device for Traveling Vehicle.

English abstract of Japanese Publication 2000025639 dated Jan. 25, 2000, one page, title—Steering and Driving Device for Vehicle.

Popular Science, Tanks and dozers turn on a dime with new all–gear steering, relevant pp. 60, 61 and 62, date of publication Jul. 1985, published in U.S.A.

The Engineer, Tank–Steering Mechanisms, relevant pp. 337, 338, 339 and 340, date of publication Mar. 3. 1967, published in U.S.A.

Excel Industries Inc., U–T–R The Ultimate Turning Radius, relevant pp. 1–6, date of publication 1992, published in U.S.A.

Excel Industries Inc., Hustler 4000 Series, relevant pp. 1–8, date of publication 1995, published in U.S.A.

Woods Equipment Company, Woods Mow'N Machine, relevant pp. 1–12, date of publication 1997, published in U.S.A.

(List continued on next page.)

*Primary Examiner*—Brian L. Johnson
*Assistant Examiner*—Matthew Luby

(57) ABSTRACT

A steering linkage coupled with a drive and steer transmission allows a steering wheel to be turned a maximum of between ninety and one-hundred-eighty degrees from a neutral straight forward position, and is adjustable for altering the maximum degree to which the steering wheel is turnable from the neutral forward position.

12 Claims, 11 Drawing Sheets

U.S. PATENT DOCUMENTS

| | | | |
|---|---|---|---|
| 2,336,911 | 12/1943 | Zimmerman | 180/9.2 |
| 2,336,912 | 12/1943 | Zimmerman | 180/9.2 |
| 2,391,735 | 12/1945 | Orshansky, Jr. | 180/17 |
| 2,520,835 | 8/1950 | England | 280/211 |
| 2,763,164 | 9/1956 | Neklutin | 74/687 |
| 3,371,734 | 3/1968 | Zaunberger et al. | 180/6.44 |
| 3,376,760 | 4/1968 | Gordanier | 74/689 |
| 3,395,671 | 8/1968 | Zimmerman, Jr. | 115/1 |
| 3,450,218 | 6/1969 | Looker | 180/6.44 |
| 3,530,741 | 9/1970 | Charest | 74/675 |
| 4,245,524 | 1/1981 | Dammon | 74/710.5 |
| 4,470,475 | 9/1984 | Carlson | 280/98 |
| 4,471,669 | 9/1984 | Seaberg | 74/687 |
| 4,718,508 | 1/1988 | Tervola | 180/6.44 |
| 4,732,053 | 3/1988 | Gleasman et al. | 74/665 L |
| 4,776,236 | 10/1988 | Gleasman et al. | 74/720.5 |
| 4,790,399 | 12/1988 | Middlesworth | 180/6.2 |
| 4,813,506 | 3/1989 | Smith | 180/6.44 |
| 4,882,947 | 11/1989 | Barnard | 74/687 |
| 4,895,052 | 1/1990 | Gleasman et al. | 74/720.5 |
| 4,917,200 | 4/1990 | Lucius | 180/6.2 |
| 5,004,060 | 4/1991 | Barbagli et al. | 180/6.44 |
| 5,042,238 | 8/1991 | White, III et al. | 280/211 |
| 5,644,903 | 7/1997 | Davis, Jr. | 56/10.8 |
| 5,649,606 | 7/1997 | Bebernes et al. | 180/307 |
| 5,722,501 | 3/1998 | Finch et al. | 180/6.44 |
| 5,842,378 | 12/1998 | Zellmer | 74/473.17 |

OTHER PUBLICATIONS

Exmark, Exmark Nobody Does It Better Professional Turf Care Equipment, relevant pp. 1–20, date of publication 1997, published in U.S.A.

Dixon Industries Inc., Dixon ZTR Riding Mowers, relevant pp. 1–4, date of publication 1997, published in U.S.A.

Shivvers Mfg., Zero Turn Radius Mower The Commercial Clipper, relevant pp. 1–4, date of publication 1997, published in U.S.A.

Ferris Industries Inc., The ProCut Z Zero–Turn Rider, relevant pp. 1–2, date of publication 1997, published in U.S.A.

Zipper–TS Mower, The Zipper–TS Mowers, relevant pp. 1–2, date of publication 1997, published in U.S.A.

Westwood, The Westwood Clipper Owners Instruction Manual, relevant pp. 1–19, date of publication unknown, believed to be published in Australia.

Electric Tractor Corporation, An Idea Whose Time Has Come, 5 pages, see specifically p. 2, date of publication—unknown, published in Ontario, Canada.

Electric Tractor Corporation, Model #9620, The Ultimate Lawn and Garden Tractor, 6 pages, date of publication—Jul. 27, 1998, published in U.S.A.

Farm Show Magazine, Battery–Powered Riding Mower, 1 page, date of publication—Mar.–Apr. 1996, published in Canada.

Deere & Company, 240,245,260,265,285, and 320 Lawn and Garden Tractors Technical Manual, front cover and pp. 10–2, 10–3, 10–4 and 10–6, date of publication—1996, published in U.S.A.

STEERING DEVICE FOR DRIVE AND STEER TRANSMISSION

BACKGROUND OF THE INVENTION

Conventional lawn and garden tractor vehicles are well adapted for use as mowing vehicles. They typically include four ground engaging wheels, the rear pair of wheels being driven and the front pair of wheels being pivotable by the operator to steer the vehicle. Conventional lawn tractors include an engine mounted at the front of the vehicle. An operator station includes a seat upon which the operator sits behind the engine. Conventional lawn tractors such as these having front mounted engines are well accepted by residential consumers. These vehicles are quite maneuverable and therefore perform well mowing grassy areas such as residential lawns. The steerable front wheels allow the vehicle to execute relatively sharp turns of relatively small radius, but generally do not allow zero radius turns or spin turns. In a zero radius turn a vehicle executes a turn about a vertical axis passing through one of its rear driven wheels. In a spin turn a vehicle executes a turn about a vertical axis passing through the centerline of the vehicle. Conventional lawn tractors have the disadvantage of being less maneuverable than vehicles that are capable of executing zero radius turns or spin turns.

It is known to provide mowing vehicles that execute zero radius turns and spin turns. One such type of vehicle provides independently controlled hydrostatic drives which can drive respective left and right drive wheels at different speeds to cause the vehicle to execute a turn to the side of the slower wheel. Left and right control levers are operatively coupled with the respective left and right hydrostatic drive mechanisms and can be manipulated by the operator seated in the operator station for controlling the speed of the respective drive wheels. As the operator pivots the right control lever forwardly the hydrostatic drive for the right drive wheel causes the right drive wheel to rotate in a forward direction. The farther the operator pivots the lever forwardly the faster the drive wheel will rotate. If the operator pivots the right control lever rearwardly, the right drive wheel will be driven in reverse. The farther the operator pivots the lever rearwardly, the faster the right drive wheel will rotate in reverse. The left drive wheel operates in similar fashion in response to the operator manipulating the left control lever. When the operator pivots both levers forwardly the same amount, both drive wheels rotate forwardly at the same speed and the vehicle is propelled forwardly in generally a straight line. To execute a turn during forward travel the operator can pivot one lever rearwardly with respect to the other lever to execute a turn in that direction. For example, with both levers pressed forward to the same degree for straight forward travel, the operator can pull back the left control lever slightly with respect to the right control lever, which will slow the left drive wheel relative to the right drive wheel, and therefore the vehicle will execute a turn to the left.

When the vehicle is stationary, the operator can pivot one control lever forwardly while keeping the other in its upright neutral position. This will cause one drive wheel to be driven forwardly while the other drive wheel remains stationary, and therefore the vehicle will execute a zero radius turn, which is a turn about a vertical axis passing through the stationary drive wheel.

The operator of such a vehicle can also execute a spin turn by pivoting one control lever forwardly and the other control lever rearwardly. This causes one drive wheel to be driven forwardly and the other drive wheel to be driven in reverse, which causes the vehicle to pivot or turn about a vertical axis located somewhere between the two drive wheels. If both drive wheels are rotating at equal and opposite directions, then the vehicle will execute a turn about a vertical axis passing through the centerline of the vehicle equidistant between the two drive wheels.

Conventional lawn mowers of this type have the advantage of being highly maneuverable. They can execute zero radius turns or spin turns. This tight turning is particularly advantageous when an operator comes to an edge of a yard during mowing operations and wants to turn around and mow in the opposite direction. The operator can simply execute a zero radius turn and begin mowing back in the opposite direction. Furthermore, spin turns are advantageous when mowing in tight spaces or when maneuvering out of confined spaces such as a storage garage. The vehicle can be driven straight into a storage building, and then when it is time to drive out of the building the operator can execute a spin turn and drive forward out of the building.

Conventional lawn mowers of this type having independently controlled hydrostatic transmissions for each drive wheel can be relatively difficult for many people to operate. The left and right control levers can be somewhat difficult for first time operators to become comfortable using. Making an accurate turn during mowing operations alongside structures such as flower beds can be difficult for many operators using the left and right hand control lever system. Since the controls are so different from conventional steering and foot pedals such as are found in automobiles, many customers of mower vehicles will not choose to purchase a vehicle having left and right control levers as is provided on typical zero turning radius mower. Because of leakage and other small differences in the two hydrostatic transmissions on each vehicle, it may be difficult for an operator to drive the vehicle in a straight line using the control levers. The operator may have to hold the left and right control levers at slightly different forward positions to drive the vehicle in a straight line. If the operator can not locate the proper locations the levers must assume in order to travel forward in a straight line, the operator will have to constantly make corrections and steer the vehicle back to the intended path of travel. Many operators find these constant adjustments difficult and bothersome.

Conventional zero turning radius mowers position the engine to the rear of or directly over the rear drive wheels, and therefore there is no large amount of weight carried far in front of or behind the rear drive wheels that has to be swung about during a turn. The position of the engine over the rear drive wheels of conventional zero turn radius mowers also helps place a large portion of the vehicle weight on the drive wheels, which will increase traction at the drive wheels and thereby enhance the vehicle's ability to execute turns.

Typical dual hydrostatic zero turning radius mowers have a mower deck that is mounted in front of the vehicle or between the front and rear pairs of wheels. The engine is mounted to the rear of the vehicle, and the operator station and seat are positioned generally in front of the engine. Because of its configuration, this type of vehicle can be perceived by the average consumer to be quite different from a conventional lawn tractor having its engine mounted at the front of the vehicle and the mower deck mounted between the front and rear pairs of wheels. Therefore, some consumers might not purchase one of these dual hydrostatic types of vehicles because it does not meet his expectations of what a lawn mowing vehicle should be.

Another type of transmission allows a vehicle to execute zero radius turns and spin turns. Military tank vehicles and other tracked vehicles have been provided with a dual differential transmission capable of zero radius turns and spin turns. This type of drive and steer transmission is described in the articles entitled Tanks And Dozers Turn On A Dime With New All-Gear Steering, and Tank-Steering Mechanisms. The transmission includes a driving portion having a driving differential which receives rotational power from the vehicle power source for propelling the vehicle during operation. The driving portion includes a drive control which can be operatively engaged by the operator for varying the speed and forward/reverse direction of the vehicle. The transmission also includes a steering portion having a steering differential. The steering portion includes a steering control that can be operatively pivoted by an operator for executing turns. The steering portion is operatively coupled with the driving portion such that when the steering input is engaged by the operator to execute a turn the steering portion increases the speed of the track on one side of the vehicle and proportionately decreases the speed of the track on the other side of the vehicle. In this manner the vehicle executes a turn. When the vehicle is stationary, the operator can engage the steering input, which will cause the track on one side of the vehicle to be driven forwardly, and the track on the other side of the vehicle to be driven rearwardly at the corresponding speed. This causes the vehicle to execute a spin turn.

As described in the article entitled Tank-Steering Mechanisms, a different transmission having planetary gear arrangements functions in a manner similar to the dual differential type of drive and steer transmission described above. This other type of transmission, hereinafter referred to as a planetary type drive and steer transmission, also includes a driving portion having a driving control, and a steering portion having a steering control. The steering portion interacts with the driving portion to increase the speed of the tracks on one side of the vehicle and correspondingly decrease the speed of the tracks on the other side of the vehicle.

These types of drive and steer transmissions allow the vehicle to be highly maneuverable, and allow the vehicle to execute zero radius turns and spin turns. These drive and steer transmissions are typically provided on heavy duty vehicles such as military tanks, bulldozers, and other large tracked vehicles.

Conventional drive and steer transmissions are not commercially available on front engine lawn tractor vehicles. The use of a conventional dual differential or planetary type drive and steer transmissions on a conventional front engine lawn tractor would not provide the steering and handling characteristics that are generally required by operators of front engine lawn tractors. For example, if a typical conventional drive and steer transmission were coupled with a front engine lawn tractor, the steering might be relatively aggressive such that small turns of the steering wheel might result in sharp turns. And many conventional drive and steer transmissions allow relatively sharp turns, or even spin turns, to be executed at relatively high speeds, which might cause a lawn tractor to tip over. These operating characteristics may be desirable for a military tank that is specially designed for stability during tight turns at high speeds, and which are operated by highly skilled and trained personnel. But these operating characteristics are generally not desirable for a front engine lawn tractor such as are used for residential mowing purposes.

Furthermore, conventional drive and steer transmission such as those used on tracked vehicle would generally not be effective at swinging the relatively large weight of the front of a front engine lawn tractor to the side in order to execute a vehicle turn. A front engine lawn tractor has a relatively large amount of weight supported by the front end of the vehicle. If a conventional drive and steer transmission were coupled with the rear wheels of a front engine lawn tractor, the rear drive wheels would be driven at different speeds in order to cause the vehicle to execute a turn. Therefore the vehicle would effectively be turned from the rear of the vehicle as the rear ground wheels rotate in engagement with the ground at different speeds. During execution of a turn the front of the vehicle would have to be swung to one side by the rear drive wheels. The relatively large weight carried at the front of the vehicle associated with the forward location of the engine would be relatively difficult to swing to one side to execute a turn. This is because the weight of the engine is located so far from the rear wheels which are effectively steering the vehicle. An analogous situation is a shopping cart with front caster wheels and which is pushed from behind in conventional fashion. The more weight that is placed in the far front of the shopping cart, the harder it become for the person pushing the cart to turn the cart from the rear. A conventional lawn tractor with a front mounted engine is similarly difficult to turn by applying steering force at the rear of the vehicle. It would be relatively difficult to swing the heavy front end of a front engine lawn tractor around to execute a turn by driving the rear wheels at different speeds. Tracked vehicle such as tanks which use conventional drive and steer transmissions generally do not encounter this problem since the tracks extend generally the entire length of the vehicle. In other words, tanks do not have a large weight located far in front of the tracks that must be swung about in order to execute a turn. Therefore, conventional drive and steer transmissions as described above which are typically used on tracked vehicles such as tanks are generally not suitable for use with a front engine lawn tractor.

Therefore, it would be desirable to provide a front engine lawn tractor that has improved maneuverability so that the vehicle can execute tighter turns and more easily operate in confined spaces. It would be desirable for such a vehicle to have the characteristics of a front engine lawn tractor such that the vehicle will meet residential consumers' expectations of a lawn mower vehicle. If such a vehicle is a front engine type vehicle, parts and manufacturing methods could be used that are common with conventional front engine lawn tractors, which would reduce the cost of manufacturing such a vehicle. It would be desirable for such a vehicle to have a conventional steering wheel and foot pedal controls that most consumers are familiar and comfortable with. It would be desirable for such a vehicle to be capable of executing zero radius turns and spin turns. Such a vehicle would be highly maneuverable. It would be desirable for such a vehicle to have steering and handling characteristics that are similar to those of a conventional lawn and garden tractor. This would allow an operator to be familiar and comfortable with the performance characteristics of the vehicle.

SUMMARY OF THE INVENTION

A lawn tractor vehicle having a front mounted engine is provided having a drive and steer type of transmission having a driving portion and a steering portion which interact to steer the vehicle by driving rear ground engaging drive wheels at different speeds. The vehicle includes a steering wheel that is operatively coupled with the steering portion via a steering linkage. The steering linkage is designed such that the operator may turn the steering wheel a maximum of between ninety and two-hundred-seventy degrees from the steering wheel's neutral straight forward position. The steering linkage includes a steering shaft coupled with the steering wheel, a pinion gear, a sector gear, a sector shaft, and a sector arm. To the sector arm is coupled a rod member that extends rearwardly to a steering arm member that is fixed with a steering control input shaft that is pivotable to control the steering portion of the transmission.

The sector arm includes a plurality of openings that are capable of receiving the steering rod member. The steering rod member can be coupled with the various openings to adjust the maximum number of degrees the steering wheel can be turned from its neutral straight forward position. One opening corresponds with ninety degrees of maximum steering wheel turn, another corresponds with one-hundred-thirty-five degrees, and the other corresponds with two-hundred-seventy degrees of maximum turn. The steering linkage allows the steering input control to shift through its full range of motion transmission regardless of which opening the steering rod is coupled with.

The present invention provides a steering mechanism for a drive and steer transmission that establishes steering and handling characteristics with which operators will be comfortable. The steering linkage helps establish steering and handling characteristics that are generally similar to those provided by conventionally steered lawn tractor vehicles. The steering linkage according to the present invention turns the vehicle aggressively enough that the operator is not required to turn the steering wheel through several revolutions in order to execute a tight turn, but does not turn the vehicle so aggressively that very slight turns of the steering wheel result in extremely tight vehicle turns. The steering linkage therefore allows the operator to accurately steer the vehicle during mowing operations.

DETAILED DESCRIPTION OF THE PREFERRED EMBODIMENT

Figure 1:
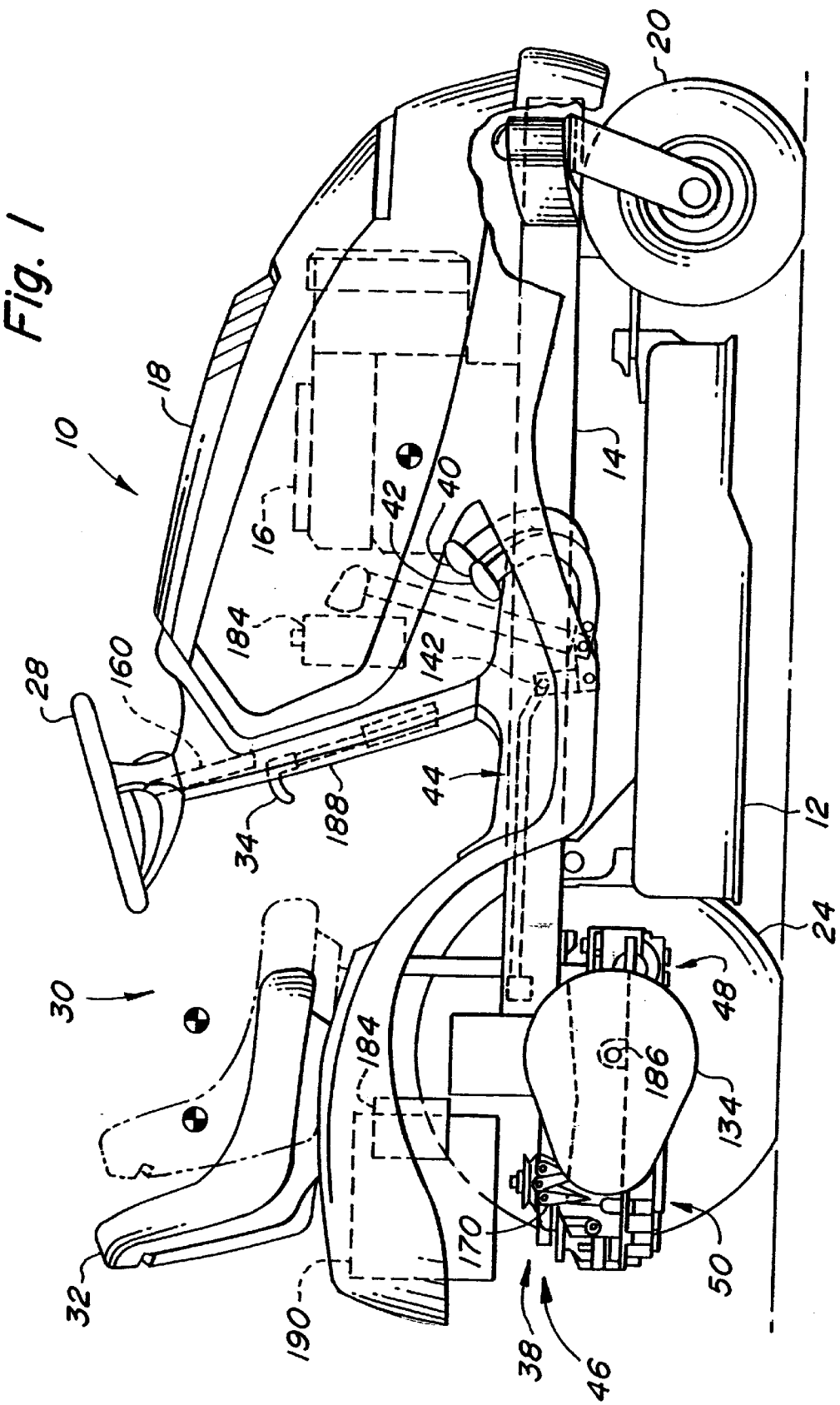
FIG. 1 is a side view of a front engine lawn tractor according to the present invention, showing the particular location of various vehicle components that help establish a desirable weight distribution between the front and rear pairs of wheels.

Referring now to the drawings, there is shown the preferred embodiment of the present invention. FIG. 1 illustrates a lawn and garden tractor vehicle 10 according to the present invention. Mounted with the vehicle 10 is a mower deck 12 positioned beneath the vehicle frame 14. A power source or engine 16 is carried beneath a hood 18 at the front of the vehicle 10, and is operatively coupled with the mower deck 12 for transmitting rotational power to mower blades within the mower deck 12. The mower blades rotate within the mower deck 12 to cut grass as the vehicle 10 travels across the ground. The vehicle 10 includes a front pair of caster wheels 20 and 22 that engage the ground and pivot as the vehicle 10 executes a turn. The vehicle 10 includes a rear pair of ground engaging wheels 24 and 26 that are operatively driven by the engine 16 for propelling the vehicle 10 across the ground. The operator can manipulate a steering wheel 28 to cause the left and right rear wheels 24 and 26 to rotate at different speeds to thereby cause the vehicle 10 to execute a turn, as will be described in greater detail below.

An operator station 30 is provided which includes a seat 32 upon which an operator sits during vehicle travel. A plurality of controls 34 are positioned in the operator station 30 and are engagable by the operator for controlling the operation of the vehicle 10. The steering wheel 28 is provided which can be manipulated by the operator for causing the vehicle 10 to execute turns. A linkage 36 that operatively connects the steering wheel 28 with the transmission 38 is separately described in greater detail below. A forward foot pedal 40 is provided and can be depressed by the operator for driving the vehicle 10 forwardly. The further the operator presses the forward pedal 40, the faster the vehicle 10 will travel in the forward mode. A reverse foot pedal 42 is also provided which causes the vehicle 10 to travel in the reverse direction as the operator depresses the reverse pedal 42. The further the operator presses the reverse pedal 42, the faster the vehicle 10 will travel in the reverse mode. A linkage 44 that extends between the foot pedals 40 and 42 and the transmission 38 will be separately described in greater detail below.

The Drive and Steer Type Transmission

The vehicle 10 according to the present invention includes a transmission mechanism 38 that serves a dual function of transmitting rotational power from the engine 16 to the drive wheels 24 and 26 for propelling the vehicle 10 across the ground, and for altering the rotational speeds of the left and right drive wheels 24 and 26 such that the drive wheels 24 and 26 rotate at different speeds to thereby execute vehicle turns and steer the vehicle 10. Two types of transmissions will be described herein which are adapted for use in accordance with the present invention for driving and steering the vehicle 10. The first will be referred to herein as a dual differential type drive and steer transmission, and the second will be referred to herein as a planetary type drive and steer transmission. The dual differential transmission will be described first.

Figure 2:
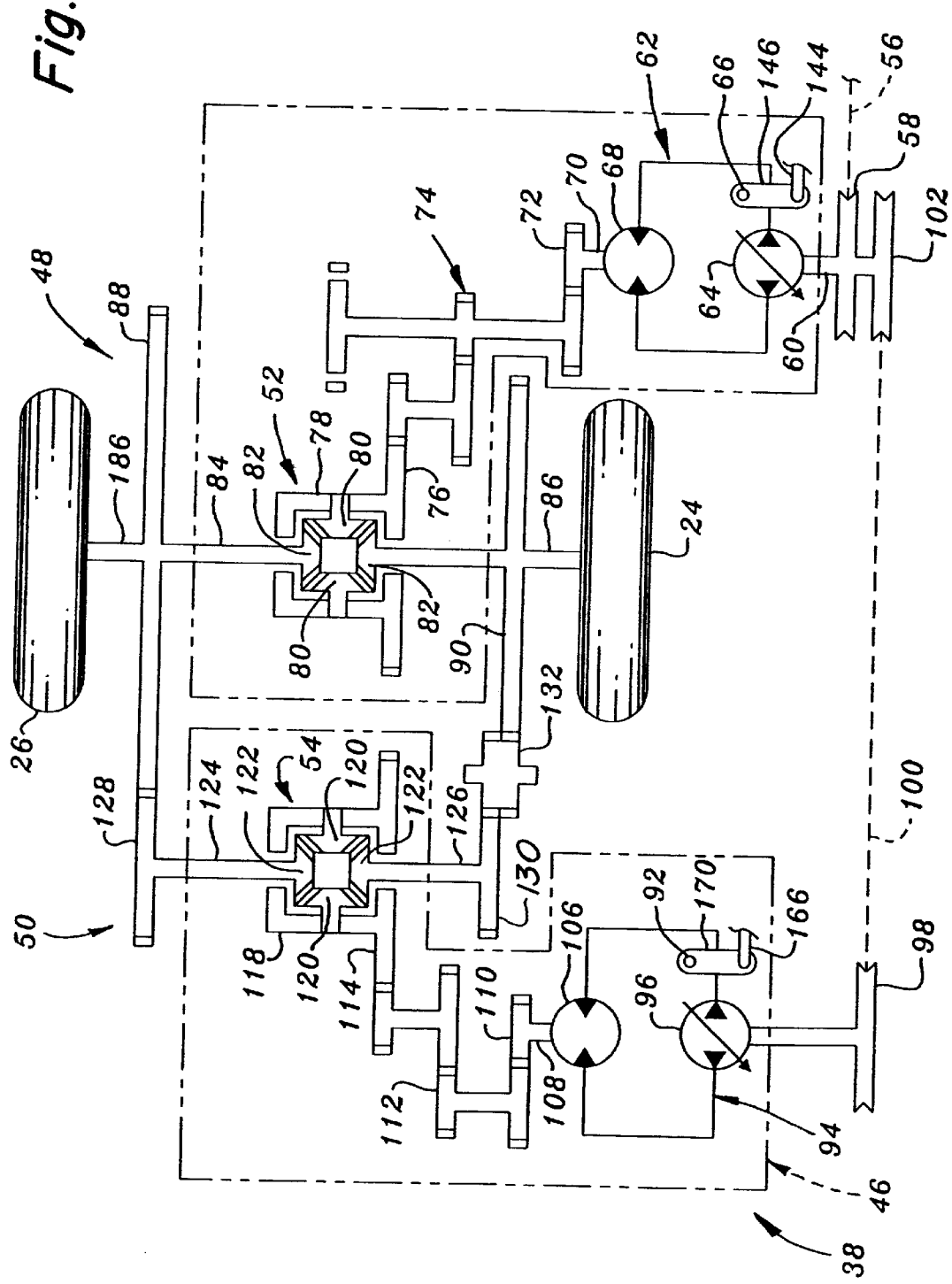
FIG. 2 is a schematic depicting the dual differential type of drive and steer transmission used according to the present invention with the vehicle shown in FIG. 1.

Referring now to FIG. 2, there is shown a schematic of a dual differential transmission 46 adapted for use in the present invention. The transmission 46 includes a driving portion 48 and a steering portion 50, each of which include a differential mechanism 52, 54. The driving portion 48 receives rotational power from the engine 16. A belt 56 operatively coupled with and driven by the engine 16 extends rearwardly and engages a driving portion pulley 58. The pulley 58 is coupled with a drive input shaft 60 of a drive portion hydrostatic pump motor combination 62. Rotational energy generated by the engine 16 is transmitted via the belt system to the drive portion pulley 58 and into the drive portion hydrostatic pump motor combination 62. The drive pump's swash plate is controllable for varying the displacement of the pump 64, and is coupled with a linkage 44 that extends to the forward and reverse pedals 40 and 42. The operator manipulates the forward and reverse pedals 40 and 42 for pivoting a drive control input shaft 66, which in turn controls the displacement of the drive pump 64 and thereby increases or decreases the amount of rotational energy from the engine 16 that is transmitted through the drive portion 48 to the drive wheels 24, 26. The speed of the vehicle 10 is thereby controlled. Depression of the forward pedal 40 causes the drive control input shaft 66 to rotate in a first direction which causes the transmission 46 to drive the drive wheels 24 and 26 in a forward direction, and depression of the reverse pedal 42 causes the drive control input shaft 66 to pivot in a second opposite direction which causes the transmission 46 to drive the drive wheels 24 and 26 in a reverse direction. The linkage 44 that extends between the foot pedals 40, 42 and the drive control input shaft 66 are described in detail below. The drive portion motor 68 includes an output shaft 70 having a gear 72. The gear 72 drives a series of gears 74 which in turn drive a ring gear 76 of the drive portion differential 52. The drive portion differential 52 includes a housing 78, spider gears 80 and a pair of side gears 82 each mounted with respective left and right axles 84, 86 extending outwardly from the differential housing 78. Fixed with the left and right axles 84, 86 are respective left and right primary gears 88, 90.

Next, the steering portion 50 of the dual differential transmission 46 will be described. The steering wheel 28 includes a linkage 36 that extends rearwardly to engage and control a steering control input shaft 92 of a steering portion hydrostatic pump motor combination 94. The steering linkage 36 is described in more detail below. The steering pump 96 receives rotational energy from the engine via the belt system. A steering portion pulley 98 engages a belt 100, which engages a second pulley 102 fixed with the drive input shaft 60. Rotational energy from the engine 16 is transmitted to the steering portion hydrostatic pump 96 via the belt 56, pulley 58, drive input shaft 60, second pulley 102, belt 100, steering portion pulley 98, and steering input shaft 92. The steering pump 96 has a variable displacement swash plate controlled by a steering control input shaft 92. The steering control input shaft 92 is coupled with the steering linkage 36 and is controlled as the operator manipulates the steering wheel 28. As the operator turns the steering wheel 28 slightly to the right the steering linkage 36 causes the steering pump input shaft 92 to pivot in a first direction corresponding to a right turn. As the operator turns the steering wheel 28 further to the right the steering linkage 36 causes the steering control input shaft 92 to pivot further in the first direction, which causes the steering pump 96 to displace more fluid and rotate the steering motor 106 faster in the first direction. When the operator turns the steering wheel 28 to the left from its neutral position the steering linkage 36 causes the steering control input shaft 92 to pivot in the second direction corresponding to a left turn.

The steering motor 106 includes an output shaft 108 having a gear 110 which, via a series of gears 112, drives a ring gear 114 of a steering differential 54. The steering differential 54 includes a housing 118, spider gears 120 and a pair of side gears 122 fixed with respective left and right steering axles 124, 126. Secondary gears 128, 130 are mounted at the outer ends of the steering axles 124, 126. The secondary gears 128, 130 each operatively mesh with a corresponding primary gear 88, 90 on the same side of the vehicle 10 for transmitting the rotational motion of the secondary gears 128, 130 to the primary gears 88, 90 during execution of a turn. The primary gear 88 on the left side of the vehicle engages the respective secondary gear 128 directly such that the left primary gear 88 rotates in the opposite direction to the secondary gear 128 it is in mesh with. The primary gear 90 on the right side of the vehicle 10 engages the corresponding secondary gear 130 by way of an idler gear 132 such that the right primary gear 90 rotates in the same direction as the secondary gear 130 on the right side of the vehicle 10. Alternatively, chains and sprockets could also be utilized to coupled the steering axles 124, 126 with the drive axles 84, 86 within the spirit of the present invention in place of the primary gears 88, 90, secondary gears 128, 130 and idler gear 132 shown in FIG. 2.

Next, the operation of the dual differential transmission 46 will be described in greater detail. First, straight forward travel will be described. In straight forward travel the operator holds the steering wheel 28 in its centered position and depresses the forward foot pedal 40. Depression of the forward foot pedal 40 causes the steering linkage 36 to pivot the drive control input shaft 66 of the drive pump 64 to a position corresponding to forward travel. This causes the drive pump 64 to begin displacing fluid, which causes the hydrostatic drive motor 68 to rotate. This causes the drive portion's motor output shaft 70, gear 72 and ring gear 76 to rotate. The drive differential 52 will rotate as a unit such that the spider gears 80 will not rotate about their axis but will rotate with the ring gear 76, thereby causing the side gears 82 to rotate at the same R.P.M.'s as the ring gear 76. The drive axles 84, 86 will therefore rotate at the same speed, resulting in straight forward vehicle travel. Furthermore, while the steering wheel 28 is held in its neutral centered position, the steering portion 50 insures that the drive axle's 84, 86 will rotate at the same speed by effectively locking the drive portion differential 52. The output shaft 108 of the steering motor 106 cannot rotate unless the steering pump 96 causes the steering motor 106 to rotate. In other words, the steering motor 106 cannot drive the steering pump 96, and therefore the output shaft 108 of the steering motor 106 is held rigidly fixed when the steering pump 96 is not driving the steering motor 106. The steering motor output shaft 108 remains stationary when the steering wheel 28 remains in its centered neutral position. Therefore, since the steering motor output shaft 108 is fixed and will not rotate, the steering portion's gear 110, series of gears 112, ring gear 114 and differential housing 118 will not rotate, and therefore the spider gears 120 can only rotate about their own axis, resulting in the side gears 122, steering axles 124, 126 and secondary gears 128, 130 rotating at identical speeds in opposite directions. Since the secondary gears 128, 130 necessarily rotate at identical speeds in opposite directions, the primary gears 88, 90 operatively coupled with the secondary gears 128, 130 also must rotate at identical speeds, causing the drive axles 84, 86 and rear drive wheels 24, 26 on each side of the vehicle 10 to rotate at identical speeds. And since the primary gears 88, 90 rotate at identical speeds, the vehicle 10 travels in a straight line when the steering wheel 28 is held in its centered position.

Since the steering motor 106 cannot back-drive the steering pump 96, the steering motor output shaft 108, gear 110, series of gears 112 and ring gear 114 are held in a stationary position when the steering wheel 28 is in its neutral centered position. This serves to effectively lock the drive portion differential 52. Since the secondary gears 128, 130 necessarily rotate at identical but opposite speeds, the primary gears 88, 90 necessarily rotate at identical speeds when the steering wheel 28 is held in its neutral centered position, which causes the drive wheels 24, 26 to also rotate at identical speeds. Since the drive wheels 24, 26 must rotate at identical speeds when the steering wheel 28 is in its centered position, the drive portion differential 52 is prevented from transmitting power from one drive wheel to the other if for example there is a loss of traction under one drive wheel. Therefore, when the steering wheel 28 is held in its centered position the steering portion 50 effectively locks the drive portion differential 52.

To execute a vehicle turn while traveling in the forward direction the operator pivots the steering wheel 28 in conventional fashion in the direction he wishes the vehicle 10 to turn. Turning the steering wheel 28 causes the steering linkage 36 to pivot the steering control input shaft 92, which causes the steering pump 96 to pump fluid to the steering motor 106. This causes the steering motor output shaft 108 to rotate. The gear 110 rotates with the steering motor output shaft 108, which causes the series of gears 112 and the steering portion ring gear 114 to rotate. This causes the steering differential housing 118 to rotate and the spider gears 120 to move with the housing 118. Since the steering portion's spider gears 120 are rotating with the housing 118 about the axis defined by the steering axles 124, 126, the spider gears 120 will apply forces to the side gears 122 that will speed up the side gear 122 that is rotating in the direction of the housing 118 and ring gear 114, and slow down by an equal amount the other side gear 122 that is rotating in the direction opposite to the housing 118 and ring gear 114. This causes the steering axle 124 or 126 and secondary gear 128 or 130 on one side of the vehicle to be slowed, and the steering axle 124 or 126 and secondary gear 128 or 130 on the other side to speed up an equal amount. The slowed secondary gear 128 or 130 will slow the primary gear 88 or 90 it is coupled to, thereby slowing the drive wheel 24 or 26 on that side of the vehicle 10. The secondary gear 128 or 130 whose speed increases will speed up the primary gear 88 or 90 to which it is coupled, thereby speeding up the drive wheel 24 or 26 on that side of the vehicle 10. The drive differential 52 allows power to be transmitted to the drive wheels 24, 26 on each side of the lawn tractor 10 even when the drive wheels 24, 26 are not rotating at the same speed. When the drive wheels 24, 26 are rotating at different speeds as described above, the vehicle 10 will execute a turn.

FIGS. 1 shows front caster wheels 20 that pivot to allow the wheels 20 to easily pivot to roll in contact with the ground as the front end of the lawn tractor 10 swings around during execution of a turn. However, other types of pivotable front wheels that do not freely caster could also be provided.

This type of transmission 46 allows very tight turns to be performed. For example, when the operator is not engaging the forward or reverse foot pedals 40, 42, the operator can turn the steering wheel 28 to execute a spin turn. When the operator is not depressing either foot pedal 40, 42, the vehicle 10 is stationary and is not being propelled in either the forward or reverse direction. Therefore the drive pump 64 is not pumping any hydraulic fluid to the drive motor 68, and the drive motor output shaft 70, gear 72, series of gears 74, ring gear 76, spider gears 80, side gears 82, drive axles 84 and 86 and primary gears 88 and 90 are stationary. If the operator then turns the steering wheel 28, the steering linkage 36 will cause the steering pump 96 to pump fluid to the steering motor 106, which will rotate the steering motor output shaft 108 and gear 110. This will rotate the series of gears 112, steering ring gear 114 and housing 118, causing the spider gears 120 to rotate with the housing 118 about the axis of the steering axles 124, 126. This causes the steering axles 124, 126 and secondary gears 128, 130 to rotate at the same speed and in the same direction. The rotational motion of the secondary gears 128, 130 is transmitted to the corresponding primary gears 88, 90, which will therefore cause the primary gears 88, 90 to rotate at equal speeds in opposite directions due to the presence of the idler gear 132 between one set of primary and secondary gears. With the primary gears 88, 90 and drive wheels 24, 26 rotating at equal speeds in opposite directions, the vehicle 10 will execute a spin turn about an axis located directly between the two drive wheels 24, 26 along the centerline of the vehicle 10. As the operator turns the steering wheel 28 further while his foot is removed from the pedals 40, 42, the drive wheels 24, 26 will rotate faster in opposite directions, which will cause the vehicle 10 to spin faster.

Figure 3:
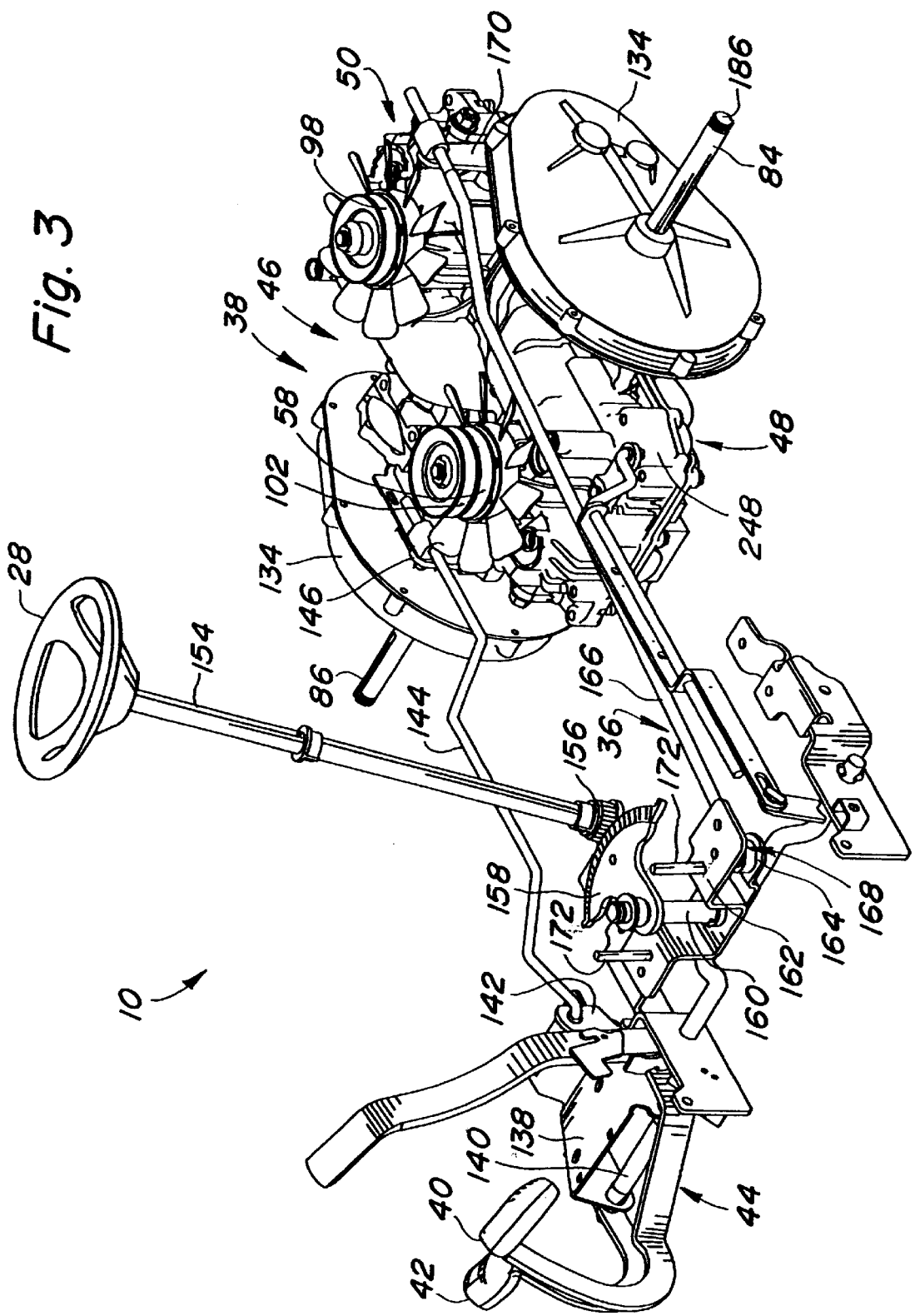
FIG. 3 is a partial perspective view of various portions of the vehicle of FIG. 1 according to the present invention, showing the vehicle frame, steering linkage, foot pedal linkage, as well as the driving portion and steering portion of the dual differential drive and steer transmission.

The embodiment illustrated in the drawings provides a driving portion 48 comprised of a commercially available hydrostatic transmission and transaxle within a conventional transmission case 248, with primary gears 88, 90 mounted to the left and right drive axles 84, 86. Similarly, the steering portion 50 is the same model of a commercially available hydrostatic transmission and transaxle within a conventional transmission case 248, with secondary gears 128, 130 mounted to the axles 124, 126. The two transmission cases 248 are mounted to the frame 14 of the vehicle 10 in close proximity such that the left primary and secondary gears 88 and 128 are in mesh and the right primary and secondary gears 90 and 130 are interconnected by way of the idler gear 132. As seen in FIG. 3, the rearward most transmission case 248 that comprises the steering portion 50 of the transmission 46 is turned 180° from the orientation of the front transmission case that comprises the drive portion 48 of the transmission 46. The respective primary gears 88, 90, secondary gears 128, 130 and idler gear 132 are generally enclosed within separate casings 134.

A second type of drive and steer transmission referred to herein as a planetary type of transmission 38 can also be utilized with the lawn tractor 10 shown in the drawing figures. Planetary type drive and steer transmissions are described in detail in the article entitled Tank Steering Mechanisms, published in the United States in The Engineer in 1967. Planetary type drive and steer transmissions 136 can be provided with a drive portion that transmits driving power to the drive wheels 24,26. A hydrostatic pump motor combination can be operatively connected to the drive portion to transmit driving power to the drive portion. A variable swash plate can be provided in the drive portion hydrostatic pump having a drive input control that can be pivoted by an operator to vary the output of the drive pump and thereby alter the speed of the vehicle. Planetary type drive and steer transmissions also include a steering portion that effectively alters the relative speeds of ground wheels on opposite sides of the vehicle to thereby execute a vehicle turn in the direction of the slowed wheel. The steering portion can include a hydrostatic pump and motor having a steering control input shaft that is pivotable to vary the position of a steering pump swash plate to thereby execute vehicle turns.

Foot Pedal Linkage

Figure 4:
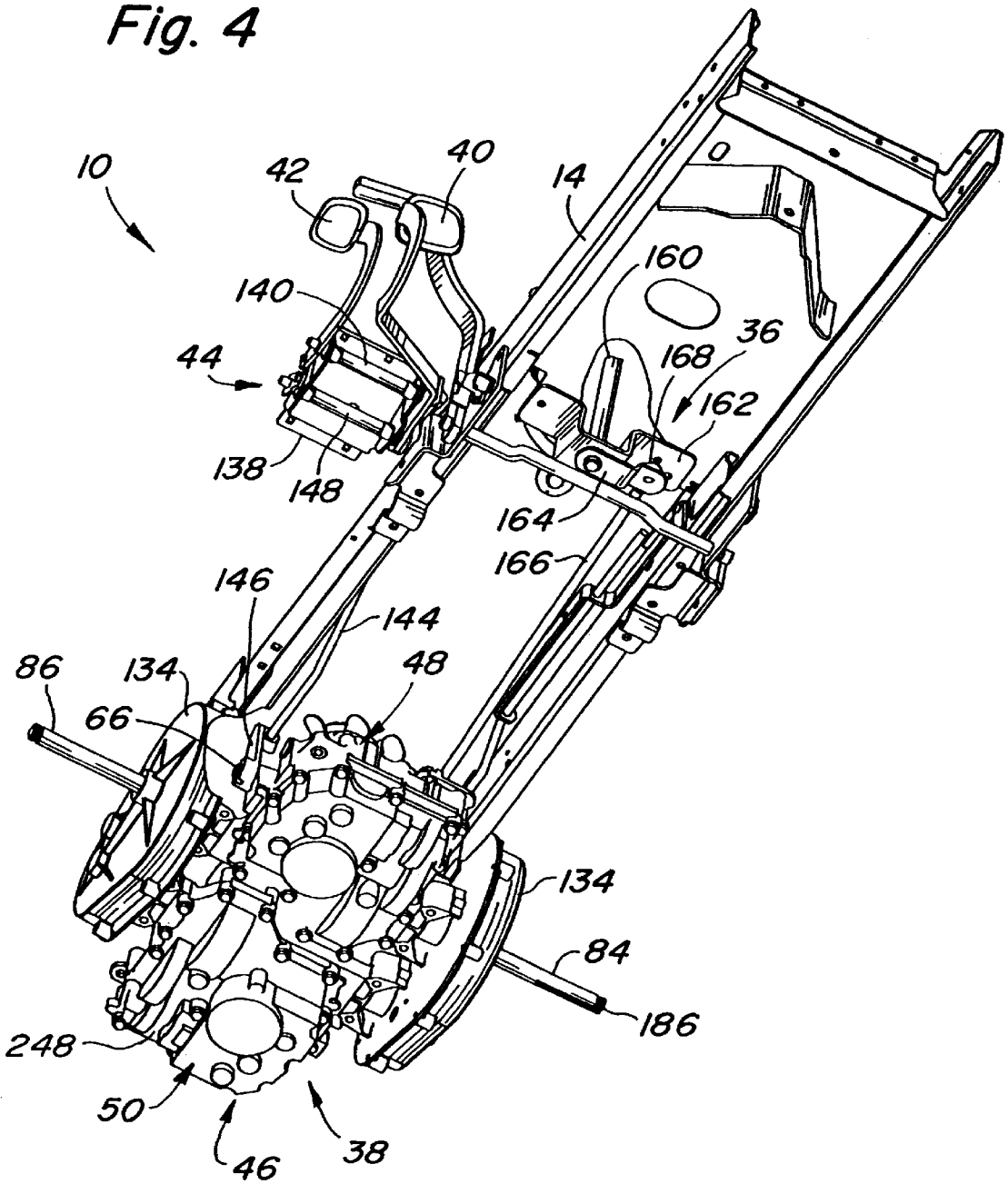
FIG. 4 is a partial perspective view from beneath the vehicle showing the vehicle frame, steering linkage, foot pedal linkage, as well as the driving portion and steering portion of the dual differential drive and steer transmission.
Figure 5:
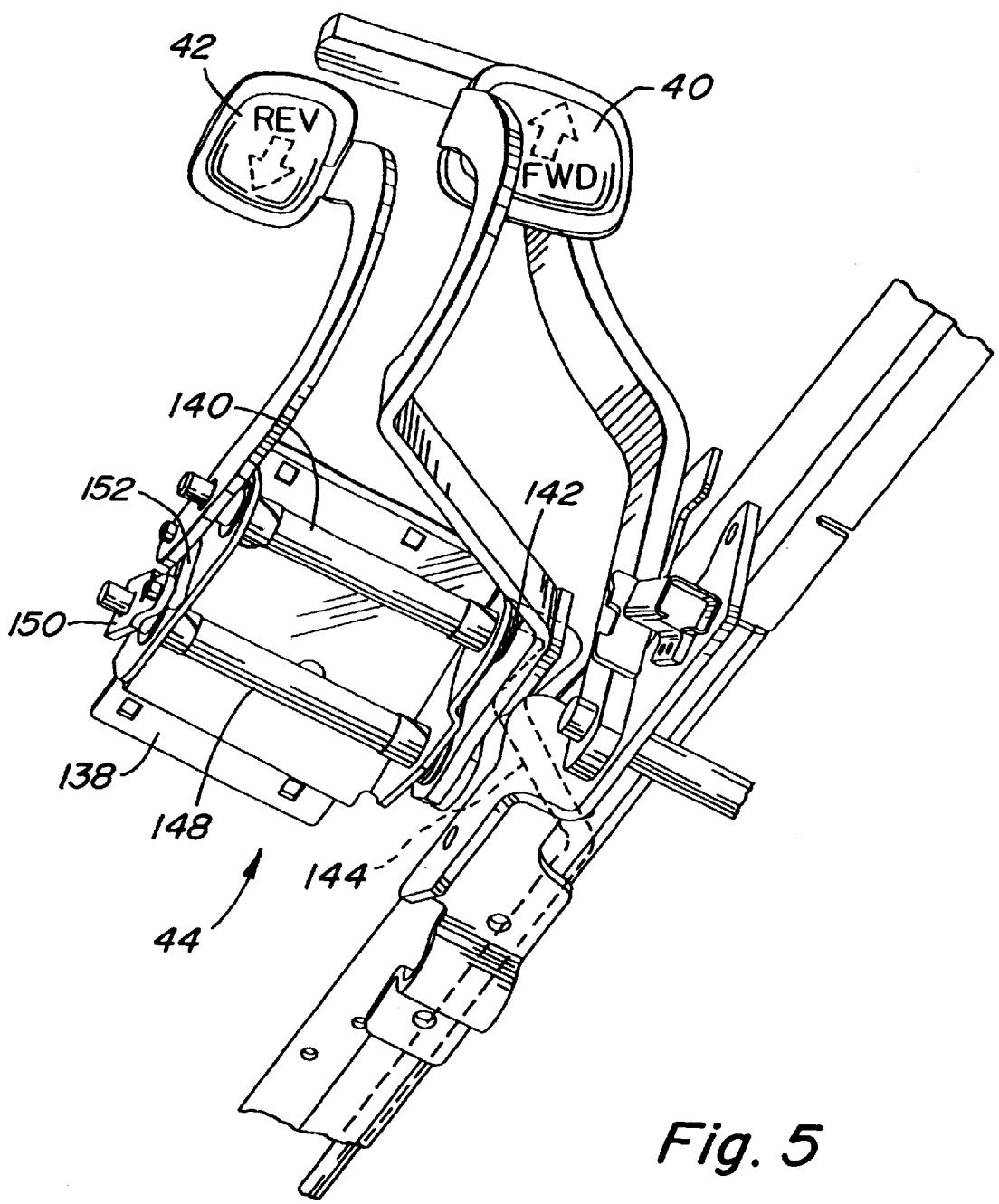
FIG. 5 is a perspective view from beneath the vehicle according to the present invention showing in greater detail the foot pedal linkage.

Referring now to FIGS. 3, 4 and 5, there is shown the foot pedal linkage 44 adapted for use with the vehicle 10 according to the present invention. A bracket 138 is mounted to the frame 14 of the vehicle 10 and pivotally supports forward and reverse foot pedals 40,42. The reverse pedal 42 is supported by a reverse shaft 140 that extends laterally through the bracket 138. A first arm 142 is fixed with the inner end of a forward shaft 148 to which the forward pedal 40 is also fixed. A driving control link rod 144 is pivotally coupled with the first arm 142 and extends rearwardly to a drive control arm 146 that is fixed with the drive control input shaft 66 of the transmission 46. As the operator presses the forward pedal 40 downwardly the forward shaft 148 pivots, causing the first arm 142 and steering control link rod 144 to shift forwardly. This causes the drive control arm 146 and drive control input shaft 66 to pivot in a first direction for causing the swash plate of the drive portion 48 of the transmission 46 to shift to a mode corresponding to forward travel of the vehicle 10. The outer end of the forward shaft 148 includes a second arm 150 that is coupled with the lower end of the reverse pedal 42 by way of a link 152. As the operator presses down on the reverse pedal 42, the link 152 and second arm 150 shift upwardly. The second arm 150 is fixed with the forward shaft 148 which therefore pivots with the second arm 150 in response to depression of the reverse pedal 42. Pivoting of the forward shaft 148 in this direction causes the first arm 142 to pivot to the rear and push the driving control link rod 144 to the rear. This causes the drive control arm 146 and drive control input shaft 66 to pivot in a second direction for causing the swash plate of the drive portion 48 to shift to a mode corresponding to reverse travel of the vehicle 10.

Figure 6:
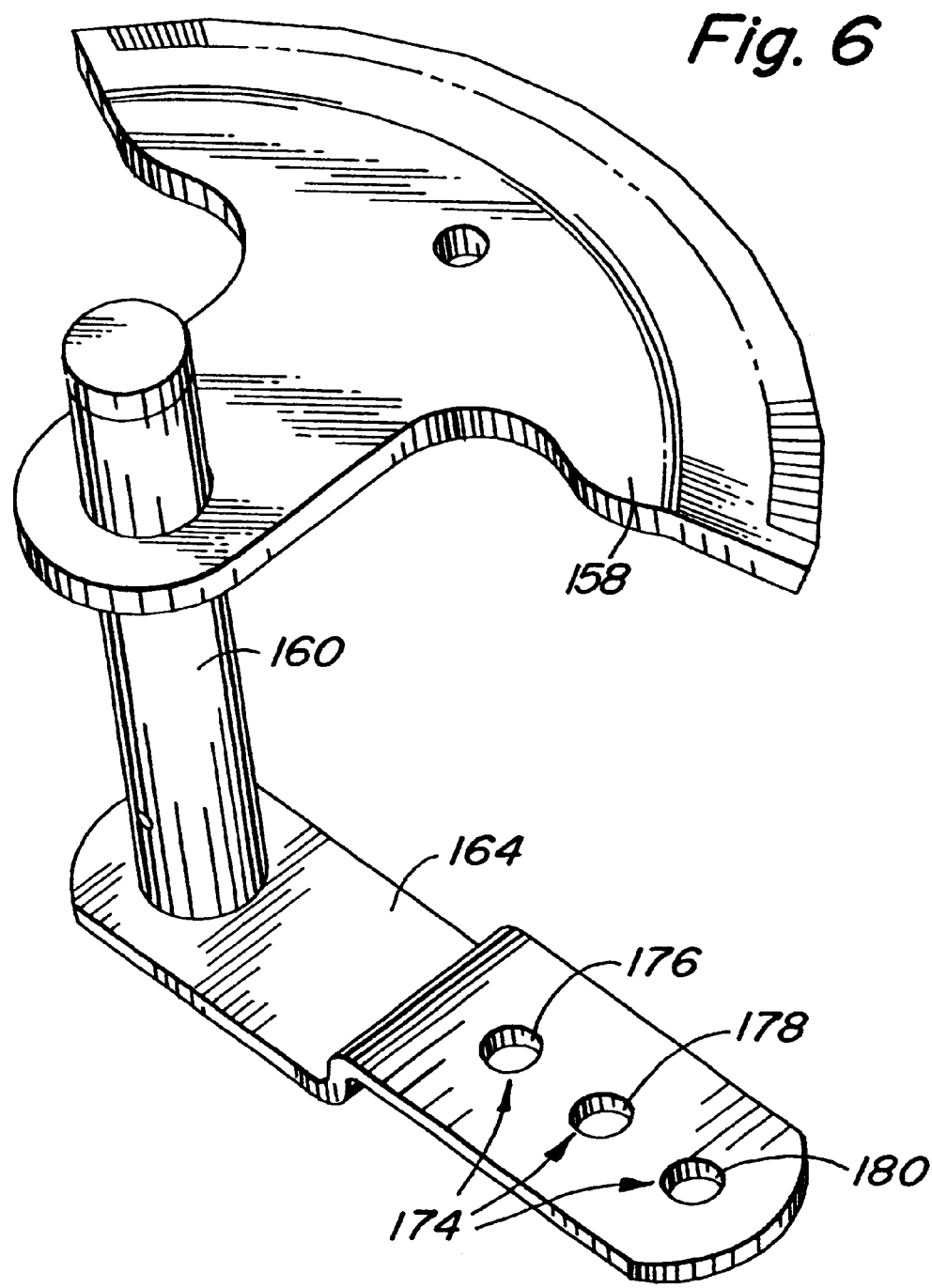
FIG. 6 is a perspective view of the sector gear, sector shaft, and sector arm which comprise a portion of the steering linkage according to the present invention.
Figure 7:
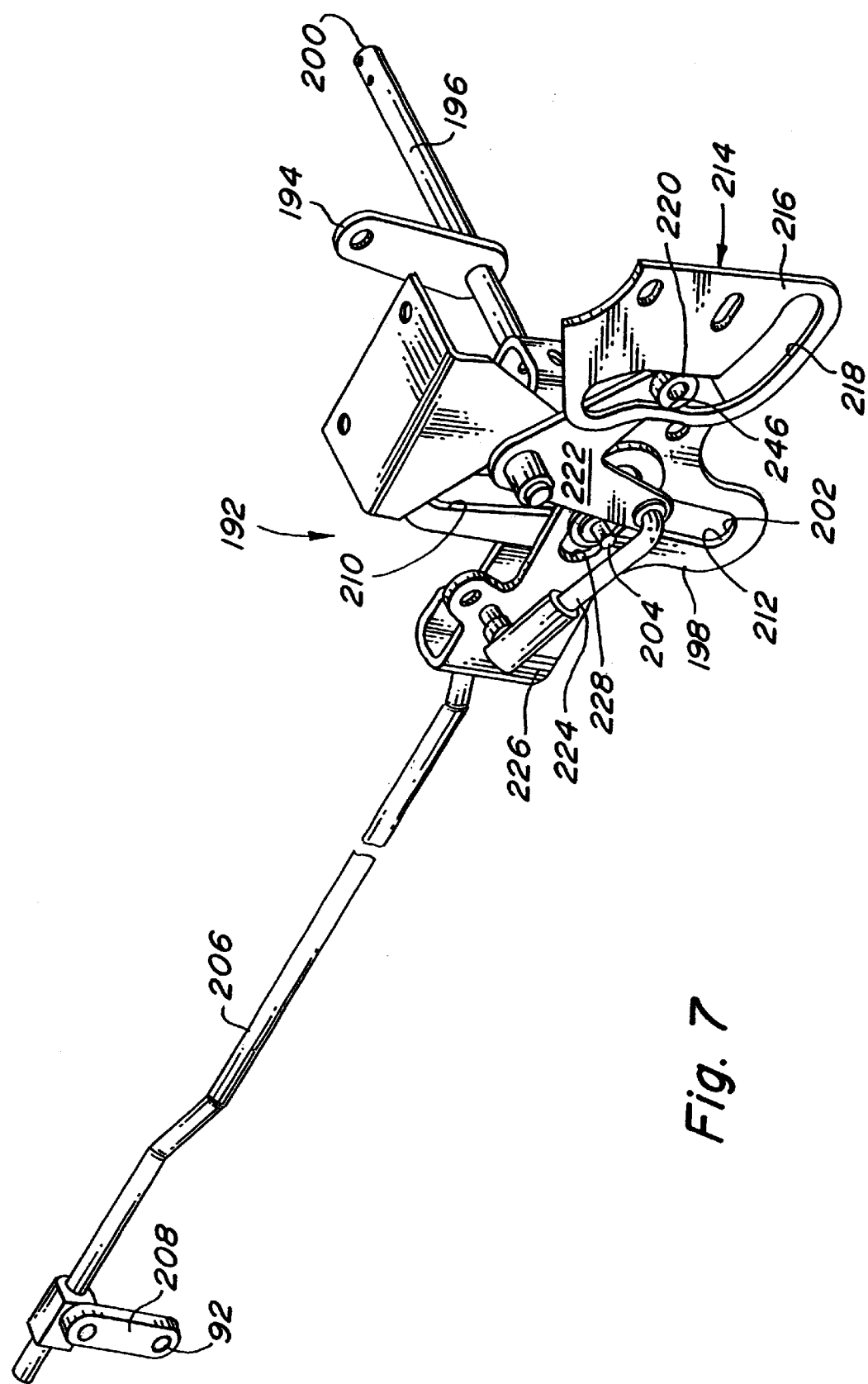
FIG. 7 is a perspective view from the right of an alternative embodiment of the steering linkage shown in FIGS. 3–6, and shows a cam member, shifter member and actuating linkage in neutral modes corresponding to the foot pedals not being depressed and the steering wheel not being turned.
Figure 8:
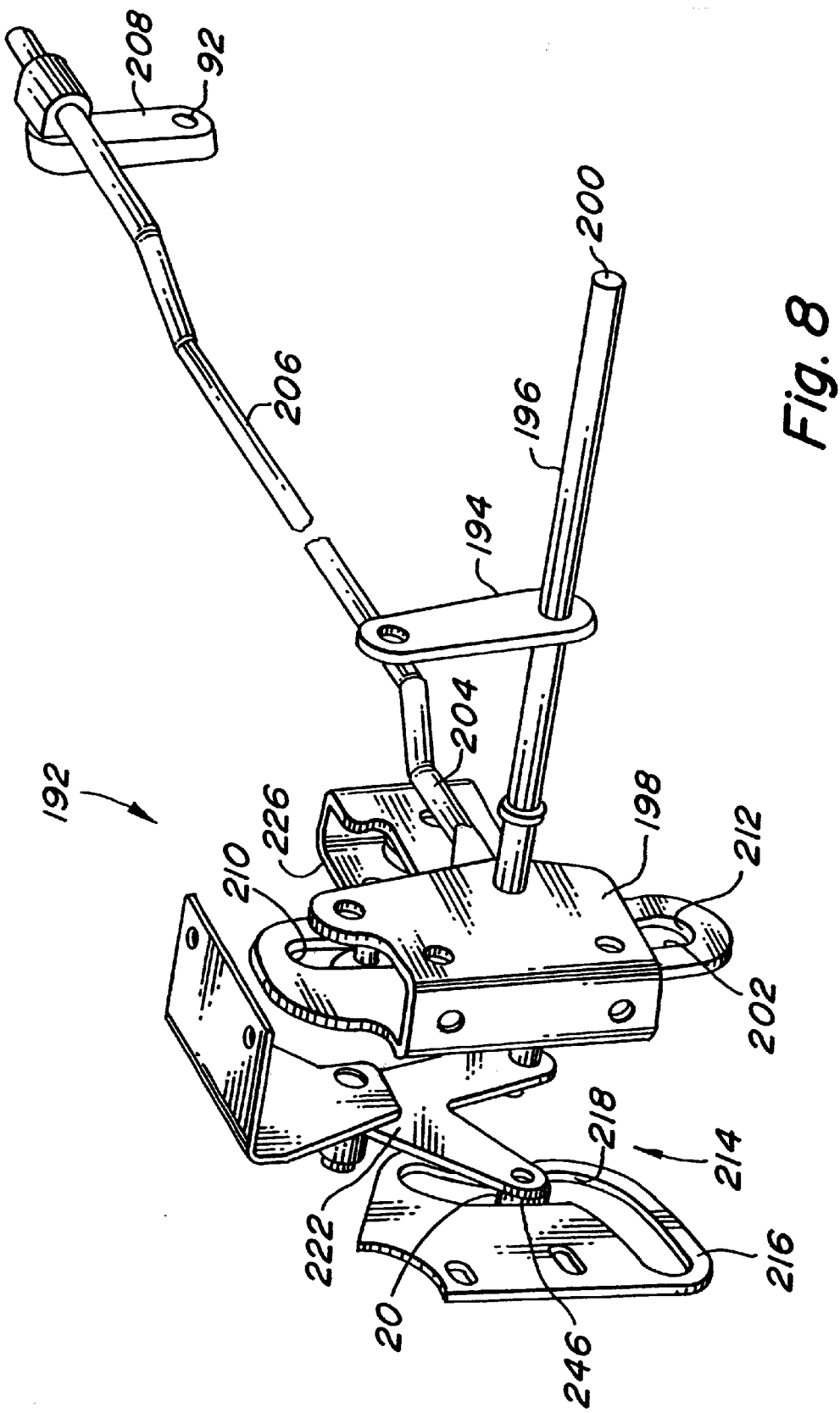
FIG. 8 is a perspective view from the left of the linkage shown in FIG. 7, showing the linkage in a neutral orientation as in FIG. 7.

Referring now to FIG. 3, there is shown the steering wheel 28 and steering linkage 36 adapted for use with the vehicle 10. The steering wheel 28 is positioned within the operator station 30 directly in front of the operator seat 32. A steering shaft 154 is fixed with the steering wheel 28 and a pinion gear 156 is fixed to the lower end portion of the steering shaft 154. A sector gear 158 engages the teeth of the pinion gear 156. A sector shaft 160 is fixed with the sector gear 158 for pivoting therewith during steering operations. The sector shaft 160 is pivotally supported by the frame 14 and a steering bracket 162. Fixed to the lower end portion of the sector shaft 160 is a sector arm 164 that pivots with the sector shaft 160 and sector gear 158 as the steering wheel 28 is turned. The sector gear 158, sector shaft 160 and sector arm 164 are best seen in FIG. 6. A steering control rod 166 is pivotally coupled with an outer portion of the sector arm 164 by way of a ball joint connection 168. The steering control rod 166 extends rearwardly toward the transmission 46, as shown in FIG. 3, and is pivotally coupled with a steering control arm 170 that is fixed with the steering control input shaft 92. The steering control input shaft 92 is pivotal in either direction from a neutral position corresponding with straight vehicle travel. Pivoting of the steering control input shaft 92 from the neutral position causes a swash plate within the steering portion hydraulic pump 96 to pivot to a new position, thereby altering the output of the pump 96 to steer the vehicle 10. Stop members 172 are mounted with and extend upwardly from the sector bracket 162 for abutment with the edges of the sector gear 158 to thereby limit the range of motion of the sector gear 158 in either direction.

The steering control input shaft 92 has a range of motion of a certain number of degrees in either direction from the neutral position. This range of motion is generally dictated by the range of motion of the swash plate that is internal to the steering portion 50 of the transmission 46. The present invention provides a steering linkage 36 that is adjustable and can be set to establish a range of steering wheel movement of approximately 135 degrees in either direction from a neutral position of the steering wheel 28. The steering linkage 36 also establishes that the range of motion of the steering wheel 28 generally corresponds with the range of motion of the steering control input shaft 92.

As stated above, the steering control input shaft 92 has a range of motion in either direction from a neutral position corresponding to straight travel of the vehicle 10. The steering control arm 170 extends upwardly from the steering control input shaft 92 and is pivotable throughout a range of motion corresponding to the range of motion of the steering control input shaft 92. The upper end portion of the steering control arm 170 therefore swings through an arc having a length that is determined by the degrees of range of motion of the steering control input shaft 92 and the length of steering control arm 170. The rear end portion of the steering control rod 166 is coupled with the steering control arm 170 and therefore shifts through a range of motion generally identical to that of the upper portion of the steering control arm 170. The steering control rod 166 is a rigid member, and therefore the front end portion of the steering control rod 166 also shifts through a similar range of motion as that of the rear portion of the steering control rod 166. It is apparent then that the length of the arc the top portion of the steering control arm 170 is capable of swinging is generally equal to the arc length that the ball joint 168 is shiftable, since the steering control rod 166 is rigid and extends between these two points 170 and 168.

The proximity of the ball joint 168 to the sector shaft 160 is important in determining the range of motion of the steering wheel 28. The maximum arc length of travel of the top portion of the steering control arm 170 is equal to the maximum arc length of travel of the ball joint 168. If the ball joint 168 is positioned close to the sector shaft 160, then the ball joint 168 will swing about a relatively small radius about the sector shaft 160 as the steering wheels 28 is turned. Because of this relatively small radius, the ball joint 168 must swing about a relatively large number of degrees to travel the arc length required to shift the top portion of the steering control arm 170 through its entire range of motion. This large number of degrees corresponds to a relatively large range of motion of the steering wheel 28. If, on the other hand, the ball joint 168 is positioned farther from the sector shaft 160 and at a location nearer the outer edge of the sector arm 164, then the ball joint 168 will swing about a relatively large radius about the sector shaft 160 as the steering wheel 28 is turned. Because of this relatively large radius, the ball joint 168 is only required to swing through a relatively small number of degrees to travel the arc length required to shift the top portion of the steering control arm 170 though its entire range of motion. This small number of degrees corresponds to a relatively small range of motion of the steering wheel 28.

The sector arm 164, as seen in FIG. 6, includes a plurality of openings 174 formed therein that are adapted for mounting the ball joint connection 168. The first opening 176 is positioned closest to the sector shaft 160, and corresponds to a range motion of the steering wheel 28 of approximately 180 degrees in either direction from the neutral position of the steering wheel 28. The second opening 178 is positioned farther from the sector shaft 160 than the first opening 176, and corresponds to a range of motion of the steering wheel 28 of approximately 135 degrees. The third opening 180 is positioned farther from the sector shaft 160 than the first or second openings 176 or 178, and corresponds to a range of motion of the steering wheel 28 of approximately 90 degrees. An operator can position the ball joint 168 within the appropriate opening to thereby adjust the linkage 36 to provide a range of motion of the steering wheel 28 that is most comfortable and desirable for that particular operator. Other openings could also be provided which correspond with other ranges of steering wheel movement, such as an opening positioned closer to the sector shaft 160 and which would correspond to 270 degrees of steering wheel movement from the straight mode.

The particular ranges of motion of the steering wheel 28 according to the present invention are beneficial for establishing desirable handling characteristics and productivity with a front engine lawn tractor 10. The ranges of motion are large enough for residential users to feel comfortable with the steering responsiveness since small turns of the steering wheel 28 do not cause the vehicle 10 to take undesirably sharp turns. The turning of the vehicle 10 is relatively gradual as the steering wheel 28 is turned by the operator. However, the range of motion of the steering wheel 28 is not so large that the operator is required to turn the steering wheel 28 an excessive amount in order to execute tight turns. If the operator is required to rotate the steering wheel 28 through several revolutions about its axis before the vehicle 10 executes a tight turn, then maneuverability suffers. The range of motion according to the present invention, in combination with the drive and steer type of transmission 38, establishes maneuverability and handling characteristics that are desirable for most operators.

The steering portion 50 of the transmission 46 shown in the drawings provides a steering control input shaft 92 that has a range of motion of approximately 17 degrees in either direction from the neutral position. The distance between the steering control input shaft 92 and the rear portion of the steering control rod 166 is 3.94 inches. The distance between the sector shaft 160 and the first, second and third openings 176,178,180 is approximately 1.66, 2.48 and 3.31 inches, respectively. An opening corresponding to 270 degrees of steering wheel movement would be 1.1 inches from the sector shaft 160. The sector gear 158 and pinion gear 156 are designed such that a one degree turn of the steering wheel 28 results in a turn of the sector shaft 160 of 0.193 degrees.

As seen in FIG. 3, stop members 172 are mounted with the bracket 162 for abutting the edges of the sector gear 158 to thereby limit the range of motion of the sector gear 158 during execution of a turn. The stop members 172 absorb the force encountered by abutment with the sector gear 158 and transmit this force to the vehicle frame 14. Without these stop members 172 the steering wheel 28 could be turned until the internal structures within the steering portion pump swash plate reach the limits of its range of motion. The forces that would be imparted to the structure within the swash plate mechanism would be relatively high, and therefore the stop members 172 are provided for abutting the sector gear 158 as these points are approached. Thus, the forces are absorbed by the stop members 172 and frame 14 and generally not the internal structure of the steering portion hydraulic pump 96. The stop members 172 block the linkage 36 from reaching the extreme limits of the steering portion swash plate's range of motion. A plurality of openings 182 in the bracket 162 can be provided for repositioning the stop members 172 at different locations corresponding with the plurality of openings 174 formed in the sector arm 164 for locating the ball joint mechanism 168 at different locations. When the ball joint 168 is moved to a different opening 174 in the sector arm 164, the sector gear 158 will have a different range of motion. Therefore repositioning the stop members 172 may be desirable when the ball joint 168 is moved to a different opening 174.

Effective Reduction Ratio

As shown schematically in FIG. 2, each secondary gear 128, 130 has a smaller diameter than the corresponding primary gears 89, 90 that they operatively engage. The primary gears 88, 90 each have a circumference that is between approximately three and five times as large as the circumference of the respective secondary gears 128, 130. More specifically, in the preferred embodiment the primary gears 88, 90 are approximately four times as large as the respective secondary gears 128, 130. This gear size differential establishes a gear reduction in the transmission 38 that results in desirable handling and steering characteristics of the vehicle 10.

The gear reduction according to the present invention causes the steering portion 50 of the transmission 38 to be capable of producing a proportionately lower ground wheel speed than the drive portion 48 of the transmission is capable of producing. Except for the primary gears 88, 90 being larger than the secondary gears 128,130, the drive portion 48 and steering portion 50 are generally identical. If the primary gears 88, 90 and respective secondary gears 128, 130 were the same size, then the drive portion 48 and steering portions 50 would have generally identical gear reductions between the power source 16 and the drive wheels 24, 26. The pulleys are all the same size, the hydraulic pumps 64, 96 and motors 68, 106 of the driving portion 48 and the steering portion 50 are the same size, and each gear in the drive portion 48 is the same size as a corresponding gear in the steering portion 50, except that the primary gears 88, 90 of the drive portion 48 are larger than the secondary gears 128, 130 of the steering portion 50. If the primary gears 88, 90 were the same size as the respective secondary gears 128, 130, then the driving portion 48 could produce a maximum speed while the steering wheel 28 is in a neutral straight forward position that is equal to the maximum speed of the ground wheels 24, 26 produced by turning the steering wheel 28 to its limit while the foot pedals 40, 42 are not being engaged. In other words, the maximum rotational speed of the drive wheels 24, 26 in straight forward operation would be equal to the maximum rotational speed of the ground wheels 24, 26 during execution of a spin turn with the steering wheel 28 turned to its maximum limit without pressing the foot pedals 40, 42. However, the secondary gears 128, 130 according to the preferred embodiment are smaller than the primary gears 88, 90, and therefore the maximum rotational speed that the steering portion 50 can cause the drive wheels 24, 26 to rotate while the foot pedals 40, 42 are not being depressed will be proportionately smaller than the maximum speed that the drive portion 48 can cause the wheels 24, 26 to rotate during straight forward operation.

This reduction ratio feature created by the difference in size between the corresponding primary and secondary gears establishes several characteristics that are beneficial or desirable in conjunction with a front engine lawn tractor 10. One of these benefits is that the radius of the tightest possible turns executable increases with the speed of the vehicle 10. In other words, at low speeds the vehicle 10 can execute very tight turns about vertical axes located between the rear wheels 24, 26. At higher speeds these tight turns are not achievable, and the radius of the tightest turns increases with the speed of the vehicle 10. When the operator presses the forward pedal 40, both wheels 24, 26 rotate forwardly in the same direction, as do the primary gears 88, 90. This causes the secondary gears 128, 130 to rotate at R.P.M.s four times higher than the respective primary gears 88, 90, since each primary gear 88, 90 is four times as large as the respective secondary gear 128, 130. At low speeds the steering pump 96 and motor 106 can cause the ring gear 114 and steering differential housing 118 to rotate at speeds high enough to apply a great enough force to the side gear 122 to stop the secondary gear 128 or 130 on one side of the vehicle 10. This will cause the vehicle 10 to execute a zero radius turn about the wheel 24 or 26 on that side of the vehicle 10. However, at higher speeds the steering motor 106 cannot generate enough speed in the steering ring gear 114 and differential housing 118 to completely stop one of the secondary gears 128 or 130. If the primary gears 88, 90 were the same size as the respective secondary gears 128, 130 the steering pump 96 and motor 106 could cause the steering ring gear 114 and differential housing 118 to rotate at a high enough speed to cause one of the secondary gears 128, 130 to become stationary regardless of the speed of the vehicle 10. However, the secondary gears 128, 130 are smaller than the primary gears 88, 90, which causes the secondary gears 128, 130 to rotate at higher R.P.M.s during straight vehicle travel. In the preferred embodiment the steering portion hydraulic pump 96 and motor 106 have the same size and output as the driving portion pump 64 and motor 68, and since the secondary gears 128, 130 are smaller than the respective primary gears 88, 90, the steering pump 96 and motor 106 cannot generate enough R.P.M.s to stop rotation of a secondary gear 128, 130 on one side of the vehicle 10 to execute a zero radius turn once the vehicle 10 is traveling over a certain speed.

Another way to view this phenomenon is to compare the maximum speed of the ground wheels 24 and 26 the steering portion 50 can establish when the foot pedals 40, 42 are not being depressed, and the maximum speed of the ground wheels 24, 26 the drive portion 48 can establish when the steering wheel 28 is not turned. In other words, compare the maximum ground wheel speed that can be created by the steering portion 50 with the maximum ground wheel speed that can be created by the driving portion 48. Because of the four to one gear reduction between the secondary and primary gears, the steering portion 50 can establish a maximum ground wheel speed when the foot pedals 40, 42 are not depressed that is one quarter the maximum ground wheel speed that can be established by the driving portion 48 when the steering wheel 28 is not turned. With the steering wheel 28 turned completely to one side and the foot pedals 40, 42 not depressed, the ground wheels 24, 26 will be rotating in opposite directions to execute a spin turn. The maximum speed of the ground wheels 24, 26 in opposite directions in this mode is one quarter the maximum speed of the ground wheels 24, 26 established by full engagement of the drive pump 64 and motor 68 when traveling straight ahead. In a sense then, the maximum effective output at the ground wheel 24, 26 that can be created by the drive portion 48 is four times as great as can be established by the steering portion 50 of the transmission 38. At higher forward speeds then, the steering portion 50 will not be able to fully counteract the ground wheel speed established by the drive portion 48. At higher speeds the steering portion 50 will not be able to completely stop a ground wheel 24, 26, and therefore zero radius turns will not be possible at these higher speeds. In fact, as the speed of the vehicle 10 increases the radius of the tightest possible turn executable increases.

In certain applications, it is desirable that a lawn tractor not be able to make tight turns at high speeds. The vehicle 10 therefore remains more stable at relatively high speeds, and rollovers are less likely to occur. The gear reduction described above reduces the ability of the vehicle 10 to execute sharp turns at high speeds, and the stability of the vehicle 10 is thereby enhanced.

The transmission 38 according to the present invention is coupled with a front engine riding lawn tractor 10. Since the engine 16 is mounted near the front of the vehicle 10 and in front of the operator station 30 a relatively large amount of weight is carried at the front of the vehicle 10. The transmission 38 acts to steer the vehicle 10 by driving the rear ground engaging wheels 24, 26 at different speeds, and the vehicle 10 executes a turn to the side of the slower wheel 24 or 26. Steering is therefore accomplished from the rear wheels 24, 26, and the front wheels 20 are castered such that they pivot freely from side to side during turns. The rear wheels 24, 26 must swing the front of the vehicle 10 to the side in order to execute a turn in this manner. The gear reduction and size differential between the secondary gears 128, 130 and the respective primary gears 88, 90 establishes a higher amount of steering torque than if there were no such gear reduction. This higher torque is advantageous in swinging the weight of the front portion of the vehicle 10 to one side to execute a turn. The relatively high torque produced by the steering portion 50 during execution of a turn which is established by the gear reduction allows relatively small hydraulic pumps 96 and motors 106 to be effective within the steering portion 50 of the transmission 38.

The gear reduction is also advantageous in establishing a desirable steering responsiveness. If the secondary gears 128, 130 and respective primary gears 88, 90 were the same size, then relatively slight turns of the steering wheel 28 would cause relatively sharp turns. However, the secondary gears 128, 130 are smaller than the primary gears 88, 90, and therefore turning of the steering wheel 28 causes the steering portion 50 to affect the speed of the drive wheels 24, 26 less than if the primary and secondary gears were the same size. In other words, relatively slight turns of the steering wheel 28 will cause the vehicle 10 according to the present invention to execute wider turns than if the primary and secondary gears were the same size. This feature is advantageous when utilized with a front engine riding lawn tractor 10, since the steering responsiveness created by the gear reduction according to the present invention is comparable to steering responsiveness on conventional lawn tractors with which operators are generally familiar and comfortable.

The drawings and above description illustrates secondary gears 128, 130 that are smaller than the primary gears 88, 90 to establish a gear reduction resulting in the operating characteristics as detailed above. However, there are other ways to accomplish this effective reduction ratio within the transmission 38 which fall within the spirit of the present invention. The various pulleys 58, 98, 102 could have different sizes to establish an effective gear reduction having the benefits as described above. For example, the pulley 98 that transmits motion from the belt 100 to the steering portion hydraulic pump 96 could be proportionately smaller than the second pulley 102 that is coupled with the drive portion hydraulic pump 64. This would establish an effective reduction ratio similar to that described in detail above. The effective reduction ratio could be accomplished by any number of gears within the transmission 38. For example, the ring gear 114 of the steering portion 50 could be sized four times as large as the ring gear 76 of the driving portion 48 of the transmission 38. A comparable difference in size between a number of different gears or bevel gears within the steering portion 50 and the corresponding gear within the drive portion 48 would establish an effective reduction ratio similar to that described above. The hydraulic pumps 64, 96 and motors 68, 106 could also have different sizes or displacements that would establish the effective reduction ratio according to the present invention. The preferred embodiment provides a single power source or engine 16 that powers both the driving portion 48 and the steering portion 50, but alternative embodiments having dual power sources having different outputs that each separately power respective driving portions and steering portions could also establish an effective reduction ratio.

The embodiment illustrated in the drawings provides a driving portion 98 comprised of a commercially available hydrostatic transmission and transaxle within a conventional transmission case 248, with primary gears 88, 90 mounted to the left and right drive axles 84, 86. Similarly, the steering portion 50 is a commercially available hydrostatic transmission and transaxle within a conventional transmission case 248, with secondary gears 128, 130 mounted to the axles 124, 126. The two transmission cases 248 are mounted to the frame 14 of the vehicle 10 in close proximity such that the primary gears 88, 90 and secondary gears 128, 130 interact. The respective primary gears 88, 90, secondary gears 128, 130 and idler gear 132 are generally enclosed within separate casings 134. The secondary gears 128, 130 can be provided having a different size than the primary gears 88, 90 in simple fashion without requiring special modification to the conventional internal mechanisms within the transmission casings 248. Providing the gear reduction between the primary gears 88, 90 and secondary gears 128, 130 therefore generally allows commercially available hydrostatic transmissions to be utilized with a minimum of modifications.

A planetary type drive and steer transmission could also be provided with an effective gear reduction having some or all of the features and advantages described above. An effective gear reduction could be established by a planetary transmission in any number of different ways which, for the sake of brevity, will not be described here but are readily apparent to those of ordinary skill in the art.

Weight Distribution

Referring now to FIG. 1, there is shown a side view of the lawn tractor 10 according to the present invention illustrating the particular location of various vehicle components. The location of vehicle components according to the preferred embodiment is different from the conventional locations of those components on conventional lawn tractors manufactured by Deere & Company having conventional transmissions and mechanical steering mechanisms. The particular locations of the various vehicle components according to the present invention allows the effective use of a drive and steer type of transmission 38 with a front engine lawn tractor 10, and establishes several advantages pertaining to vehicle performance, handling and stability of a riding lawn tractor 10 having a front mounted engine 16 and a drive and steer transmission 38, as will be described in greater detail below.

The vehicle engine 16 according to the present invention is positioned in front of the operator station 30. The engine 16 is supported by the front portion of the vehicle frame 14 behind the front wheels 20. The engine 16 according to the preferred embodiment is located further back on the frame 14 than on many typical conventional front engine lawn tractors. This causes a larger portion of the weight of the engine 16 to be borne by the rear wheels 24, 26. The wheel base of the vehicle 10 is approximately 1175.5 mm, and the center of gravity of the engine 16 is located approximately 841.6 mm forward of the axis 186 of the rear drive wheels 24, 26. Therefore, approximately 71.5% of the wheel base length is behind the center of gravity of the engine 16.

The vehicle 10 according to the present invention also provides a battery 184 which is operatively coupled with the internal combustion engine 16 in conventional fashion via cables. The vehicle battery 184 can be positioned in the engine compartment in close proximity to the engine 16 or behind the operator station 30 generally behind the axis 186 of the rear drive wheels 24, 26. If positioned behind the axis 186 of the rear drive wheels 24, 26, the weight of the battery 184 would be borne entirely by the rear ground wheels 24, 26. None of the weight of the battery 184 would be supported by the front wheels 20.

The location of the operator station 30 according to the present invention as shown in FIG. 1 is further to the rear on the vehicle 10 than is the operator station of many conventional lawn tractors. The seat 32 upon which the operator sits during operation of the vehicle 10 according to the preferred embodiment is positioned further back than is the seat of many conventional vehicles. The position of the seat 32 is adjustable fore and aft. The range of motion of the seat 32 is such that only the forwardmost positions of the seat will result in the center of gravity of the seated operator being located forward of the rear wheel's axis 186. Most of the seat's range of motion will result in the seated operator's center of gravity being positioned directly over or to the rear of the axis 186 of the rear wheels 24, 26. When the seat 32 is positioned at the mid-point of its range of motion, the center of gravity of the seated operator will be located to the rear of the rear wheel's axis 186. Smaller operators who are generally relatively light might position the seat 32 in its most forward positions. But relatively small and light operators will not contribute a large amount of weight to the front of the vehicle 10, since they are relatively light. Taller operators who will position the seat 32 further back are generally relatively heavy, and will have a more significant impact on the overall weight of the vehicle 10. Therefore, these heavier operators will tend to position the seat 32 at the middle or rear of its range of positions such that their center of gravity will be behind the axis 186 of the rear wheels 24, 26. This will result in their weight being generally borne entirely by the rear wheels 24, 26.

Since the operator station 30 is positioned further to the rear on the vehicle 10 than on many conventional lawn tractors, a greater portion of the weight of various components within the operator station such as the steering wheel 28, steering shaft 154, steering console 188, and other vehicle controls are borne by the rear wheels 24, 26.

The drive and steer transmission 38 utilized according to the present invention is also oriented and positioned in such a manner to cause the rear vehicle wheels 24, 26 to bear greater weight than the front wheels 20. The drive portion 48 of the transmission 46 is generally positioned directly between the rear drive wheels 24, 26 and generally along the axis 186 extending between the rear wheels 24, 26. The steering portion 50 of the transmission 46 is positioned to the rear of the drive portion 48, and is therefore located to the rear of the axis 186 of the rear wheels 24, 26. The position of the steering portion 50 behind the axis 186 of the rear wheels 24, 26 serves to place greater weight on the rear wheels 24, 26, and tends not to contribute to weight on the front wheels 20.

As seen in FIG. 1, the gas tank 190 according to the preferred embodiment is located at the rear of the vehicle 10 behind the axis 186 of the rear wheels 24, 26. Many conventional lawn tractors typically position the gas tank in front of the operator station in close proximity to the engine and within the engine enclosure or hood. The position of the gas tank 190 according to the preferred embodiment behind the operator station 30 and behind the axis 186 of the rear wheels 24, 26 serves to distribute the weight of the gas and gas tank 190 to the rear wheels 24, 26 and not to the front wheels 20. This increases the proportion of vehicle weight borne by the rear wheels 24, 26.

Vehicle components positioned behind the rear axle 186 serve a purpose of directing the entire amount of their weight to be borne by the rear wheels 24, 26. By being positioned behind the rear axle 186 of the vehicle 10 they also serve to shift some of the weight that otherwise would be borne by the front wheels 20 to be borne by the rear wheels 24, 26. Weight that is positioned behind the rear wheels 24, 26 tends to effectively lift the front end about the axis 186 of the rear wheels 24, 26. The vehicle's front wheels 20 are not actually lifted off the ground by this effect, but merely some of the weight that was otherwise carried by the front wheels 20 is now carried by the rear wheels 24, 26.

The above described locations of the various vehicle components such as the gas tank 190, battery 184, engine 16, mower deck 12, operator station 30 and seat 32 serve the purpose of optimizing the distribution of operator and vehicle weight between the front and rear pairs of wheels 20 and 24, 26. More specifically, the location of the various vehicle components serves to establish a weight distribution of approximately 75% of the vehicle and operator weight to the rear pair of wheels 24, 26 and approximately 25% of the vehicle and operator weight to the front pair of wheels 20. This type of weight distribution enhances the handling and stability of the vehicle 10, and allows the vehicle 10 to function properly while employing a drive and steer type of transmission 38. The type of drive and steer transmission 38 employed by the preferred embodiment requires a large amount of weight to be applied to the drive wheels 24, 26 in order for the proper traction to be created between the drive wheels and the ground surface. If there is insufficient traction at the drive wheels 24, 26, then the drive wheels 24, 26 may slip, which may impair travel of the vehicle 10. Furthermore, since the vehicle 10 is steered by driving the rear drive wheels 24, 26 at different relevant speeds, loss of traction at the drive wheels 24, 26 may impair the steering of the vehicle 10. Therefore the location of the various vehicle components are situated according to the preferred embodiment to place a relatively large percentage of the vehicle and operator weight on the rear pair of drive wheels 24, 26.

A proper amount of weight must also be borne by the front pair of wheels 20 in order for the vehicle 10 to function properly. If very little weight is borne by the front pair of wheels 20 then the front of the vehicle 10 would be very light, which might cause the vehicle 10 to tip rearwardly about the axis 186 of the rear wheels 24, 26 such as when driving up a slope. If the front of the vehicle 10 is too light the lawn tractor 10 may therefore become unstable. A larger amount of weight on the front wheels 20 will generally increase vehicle stability in this regard. However, if too much weight is on the front pair of wheels 20 then it may become difficult for the rear drive wheels 24, 26 to swing the front of the vehicle 10 around in order to execute a turn. If the front of the vehicle 10 is relatively heavy, then a large force is required to swing the front of the vehicle 10 to either side to execute a turn. To create this large force the transmission 38 must be sized sufficiently large to apply such a large force and the traction between the drive wheels 24, 26 and the ground surface must be relatively high. Therefore a relatively light front end allows the steering portion 50 of the transmission 46 to be sized smaller to be less powerful and less costly, and would allow the vehicle 10 to execute turns even with relatively little traction between the drive wheels 24, 26 and the ground surface. In this sense a relatively light front end would be advantageous since such a vehicle 10 would be easier for the rear wheels 24, 26 to turn.

Taking into consideration the above factors, an optimum amount of weight is applied to the front pair of wheels 20 according to the preferred embodiment such that the front of the vehicle 10 is light enough for the rear drive wheels 24, 26 to swing around the front end during execution of a turn and such that the front end is heavy enough to reduce any tendency of the vehicle 10 to tip rearwardly as when traveling forward straight up a slope. An optimum weight distribution of approximately 75% on the rear drive wheels 24, 26 and 25% on the front pair of wheels 20 is established. A range of 70% to 80% of vehicle and operator weight on the rear wheels 24, 26 and 20% to 30% percent on the front wheels 20 is believed to be acceptable.

The lawn tractor 10 is described above as having components arranged in such a way as to result in a desired distribution of weight between the front 20 and rear 24, 26 pairs of wheels. Weights could also be added to particular locations on the vehicle 10 to help establish the appropriate distribution of weight between the front 20 and rear 24, 26 wheels. Weights added to the rear portion of the frame 14 of the vehicle 10 behind the rear axle 186 would add weight to the rear wheels 24, 26 and reduce the weight borne by the front of the vehicle 10.

The preferred embodiment provides vehicle components arranged at particular locations different from the locations of those components on many conventional lawn tractors. The arrangement and location of vehicle components of many conventional tractors establishes a relatively large weight on the front of the vehicle associated with the engine, battery and gas tank being mounted to the front of the vehicle and in front of the operator station. The location of the mower deck and also the location of the operator seat that places the operator's center of gravity in front of the rear wheel axis also contributes a relatively large amount of weight to the front wheels of conventional lawn tractors. The location of vehicle components on many conventional lawn tractors establishes a relatively heavy front end and relatively light rear that is generally suitable for conventionally steering using pivoting front wheels, but is generally not suitable for use with a drive and steer type of transmission that steers the vehicle by driving the rear wheels at different relative speeds. The particular arrangement and location of vehicle components according to the present invention establishes a weight distribution between the front 20 and rear 24, 26 pairs of wheels that allows a drive and steer type of transmission 38 system to be effectively used on a rear wheel drive lawn tractor 10 having a front mounted engine 16 that is supported by the frame 14 in front of the operator station 30. The aforesaid weight distribution established by the arrangement and location of components as described above allows a riding lawn tractor 10 having a front mounted engine 16 to be effectively steered by driving the rear wheels 24, 26 at different relevant speeds.

Use of a drive and steer type of transmission 38 with a front engine riding lawn tractor 10 will enhance maneuverability of that type of lawn tractor. Front engine lawn tractors having conventional transmissions and front engine lawn tractors 10 having drive and steer transmissions 38 according to the present invention will contain common and/or similar parts. Commonality of parts between conventional front engine lawn tractors and lawn tractors 10 according to the present invention will result in beneficial economies of scale that will generally reduce the manufacturing costs of both types of front engine lawn tractors. Consumers are generally familiar and comfortable with lawn tractors with front mounted engines, and many consumers find lawn tractors having front mounted engines the most desirable type of lawn tractor commercially available. Providing a front engine type of lawn tractor with the increased maneuverability associated with a drive and steer type of transmission will allow many consumers to purchase the type of tractor they find most desirable, and with greater maneuverability than conventional lawn tractors.

Reverse Steering Logic Mechanism

As explained in detail above, the steering portion 50 of the transmission 38 interacts with the drive portion 48 of the transmission 38 to increase the speed of the drive wheel 24 or 26 on one side of the vehicle 10 and decrease the speed of the drive wheel 24 or 26 on the other side of the vehicle 10 to thereby execute a vehicle turn to the side of the vehicle 10 having the slower wheel 24 or 26. For example, when driving forward, the forward foot pedal 40 is depressed, which causes the drive portion swash plate to pivot and transmit power to the drive portion motor 68, which in turn operatively drives the ring 76 gear, housing 78 and axles 84, 86 of the drive portion 48. This causes the drive wheels 24, 26 to rotate in a forward direction. As the steering wheel 28 is turned by the operator during forward vehicle travel, the sector arm 164 pivots as the steering wheel 28 pivots, which in turn causes the steering portion swash plate to pivot and transmit power to the steering portion motor 106. Rotational motion from the motor 106 is transmitted to the steering portion ring gear 114. The steering portion axles 124, 126 are already rotating in opposite directions since they are operatively coupled with the rotating primary gears 88, 90 by way of the gear teeth and the idler gear 132. As the steering portion ring gear 114 and housing 118 rotate, the spider gears 120 rotate with the housing 118. The rotation of the housing 118 and spider gears 120 will add speed to the steering axle 124 or 126 that is rotating in the same direction as the steering housing 118 and spider gears 120, and will decrease the speed of the steering axle 124 or 126 that is rotating in the opposite direction of the steering housing 118 and spider gears 120. These increases and decreases in rotational energy of the steering axles 124, 126 are transmitted to the drive axles 84, 86 via the secondary gears 128, 130 and primary gears 88, 90 operatively in mesh with each other. Therefore, the drive wheel 24 or 26 on the side of the steering axle 124 or 126 whose speed is increased will speed up, and the drive wheel 24 or 26 on the side of the steering axle 124 or 126 whose speed is decreased will slow down. The driving portion differential 52 allows this differential in drive wheel speed to occur.

The steering linkage and transmission 46 shown in FIGS. 1–6 is designed so that as the steering wheel 28 is turned to the left when traveling forward the steering portion 50 of the transmission 46 causes the left drive wheel 26 to be slowed and the right drive wheel 24 to speed up, which results in a turn to the left in the direction that the steering wheel 28 is pivoted when traveling in the forward direction. This is similar to how an automobile is steered. However, when the vehicle 10 shown in FIGS. 1–6 is driven in the reverse direction of travel, the vehicle 10 will not steer in a manner similar to an automobile or conventionally steered lawn tractor.

When operating in reverse, the reverse foot pedal 42 is depressed by the operator, which causes the drive swash plate to rotated to a reverse mode, causing the drive motor 68 to rotate the output shaft 70 in a reverse direction. This causes the drive portion ring gear 76 to rotate in a reverse direction and the drive axles 84, 86 and drive wheels 24, 26 to rotate in the reverse direction. As the steering wheel 28 is turned, the steering portion swash plate pivots, which causes rotational power to be transmitted from the steering portion pump 96 to the steering motor 106. This rotational motion is operatively transmitted to the steering portion ring gear 114, which will begin to rotate. The steering axles 124,126 are already rotating in opposite directions since the right secondary gear 130 is in mesh with the idler gear 132 and the left secondary gear 128 is directly in mesh with the right primary gear 90 rotating in the reverse direction of travel. In the reverse direction of travel the steering axles 124, 126 rotate in directions opposite to the directions they rotate when the vehicle 10 is traveling in the forward direction. During travel in reverse, the speed of the steering axle 124, 126 that is rotating in the same direction as the steering housing 118 will increase its speed in the reverse direction, and the speed of the steering axle 124, 126 that is rotating in the opposite direction of the steering housing 118 will decrease its speed in the reverse direction. The vehicle 10 will thereby execute a turn about the slowed wheel 24 or 26. But because when traveling in reverse the steering axles 124, 126 are rotating in directions opposite to the direction they spin during forward travel, the wheel 24 or 26 that speeds up in the forward direction when the steering wheel 28 is turned a particular direction will decrease speed when the vehicle 10 is traveling in the reverse direction. Therefore, when the vehicle 10 is traveling in reverse and the steering wheel 28 is turned to the left, the right wheel's speed in reverse is slowed, and the left wheel's speed in reverse is increased, causing the vehicle 10 to turn in reverse to the operator's right. When the vehicle 10 is traveling in reverse and the steering wheel 28 is turned to the right, the right wheel's speed in reverse is increased, and the left wheel's speed in reverse is decreased, causing the vehicle 10 to turn in reverse to the operator's left. The vehicle 10 shown in FIGS. 1–6 therefore does not steer in reverse in a fashion similar to an automobile or conventionally steered lawn tractor, which execute turns to the operator's left when the steering wheel is turned to the left in reverse, and which execute turns to the operator's right when the steering wheel is turned to the right when traveling in reverse.

Referring now to FIGS. 7–11, there is shown a mechanism which can be utilized with the vehicle 10 shown in FIGS. 1–6 to alter the steering logic in reverse such that the vehicle 10 will turn in reverse in a fashion similar to an automobile or conventionally steered lawn tractor.

Figure 9:
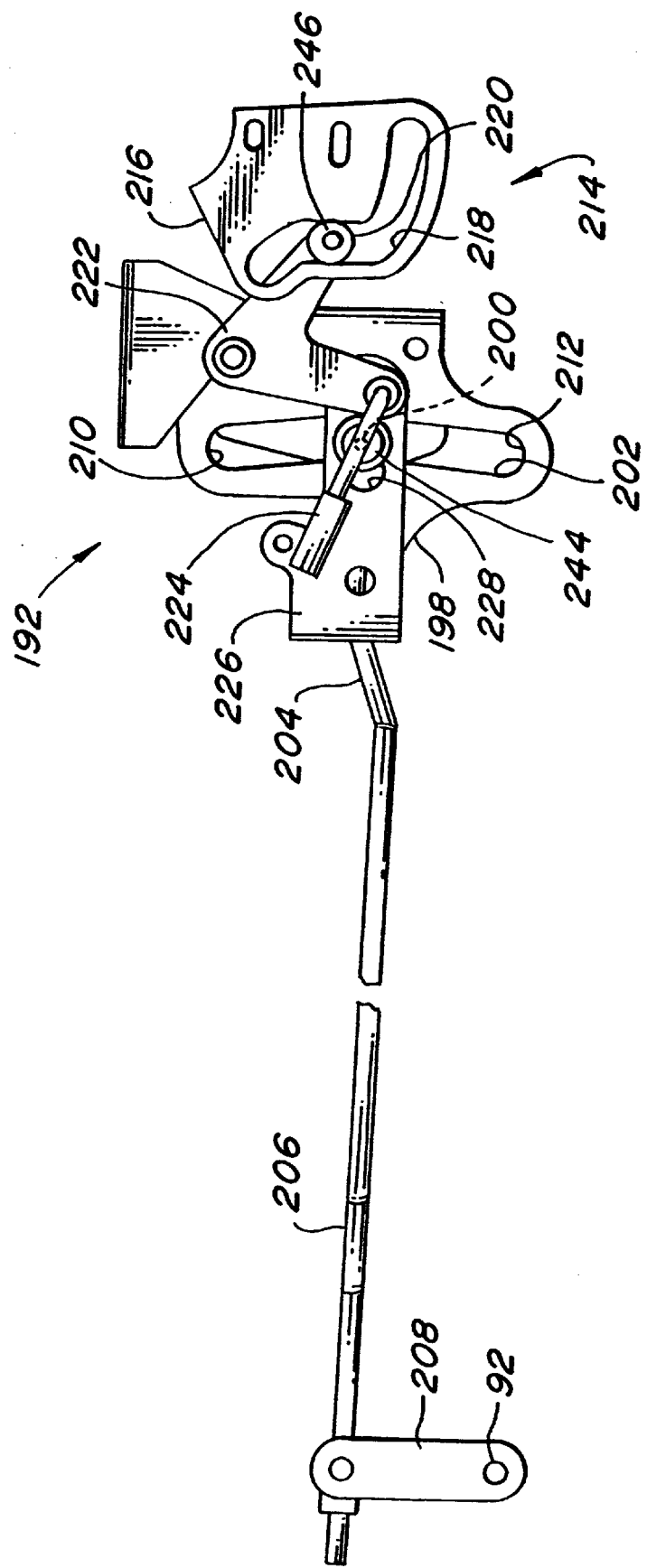
FIG. 9 is a side view from the right of the linkage shown in FIG. 7, showing the linkage in a neutral orientation as in FIG. 7.
Figure 10:
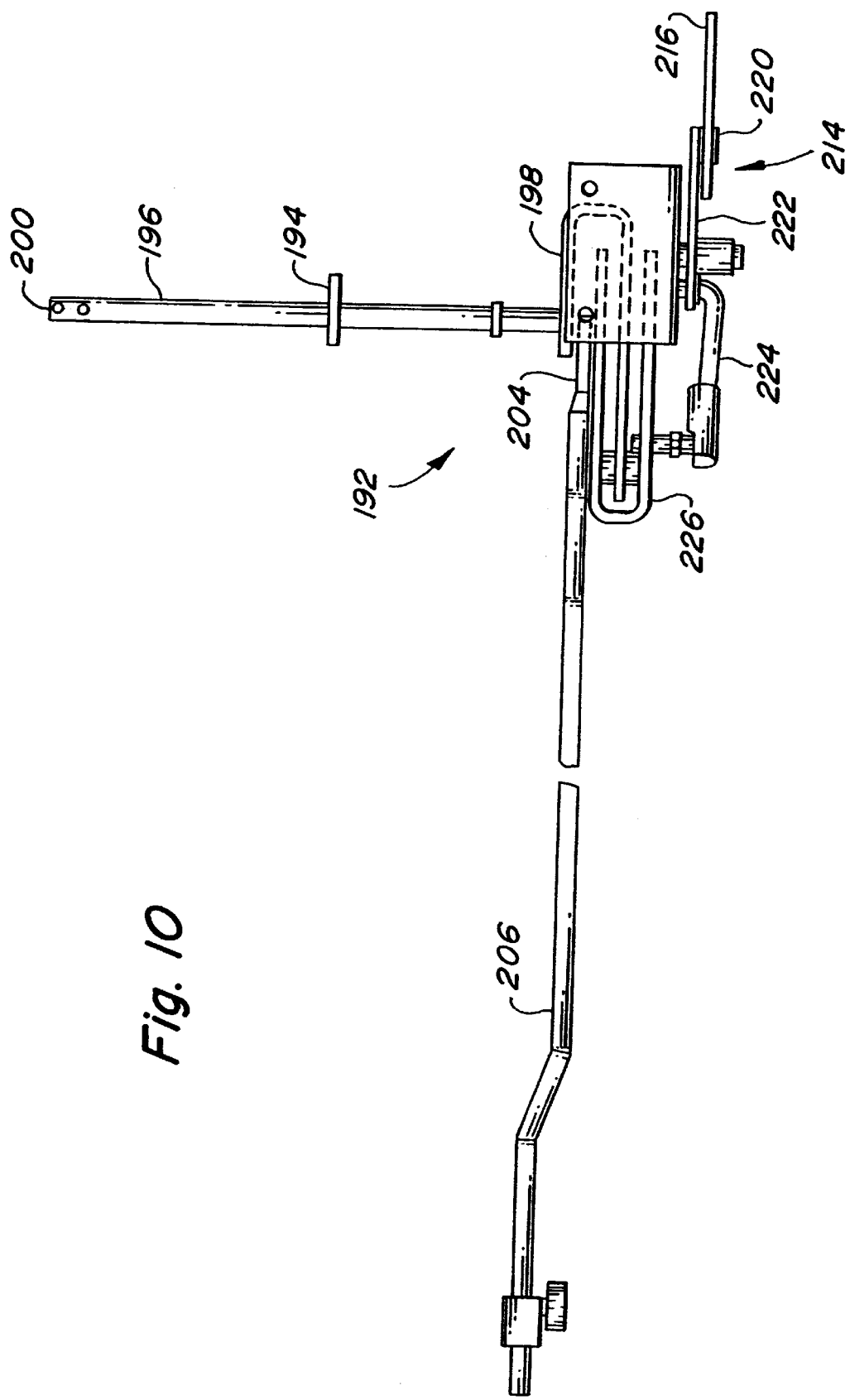
FIG. 10 is a plan view of the linkage shown in FIG. 7.
Figure 11:
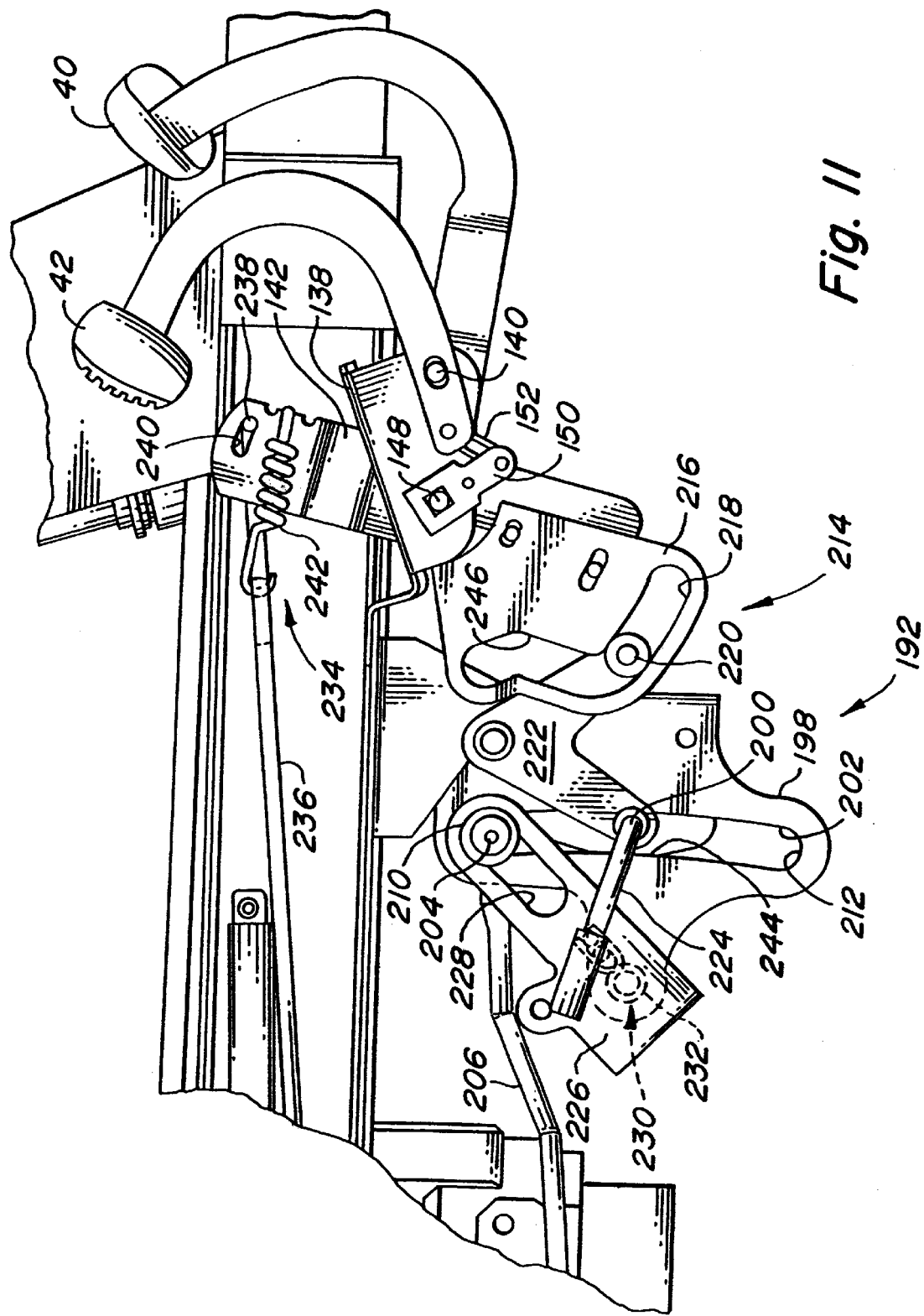
FIG. 11 is a side view from the right of the linkage shown in FIGS. 7–10, showing the forward pedal depressed and the elongate member in the upper end of the slot formed in the cam member.

FIGS. 7–11 show a portion of the steering linkage or steering device 192 that operatively extends from the steering member or steering wheel 28 to the steering control input 92 of the steering portion 50 of the transmission 46. A steering arm 194 is operatively coupled with the sector arm 164 to pivot in response to pivotal movement of the steering wheel 28. A rod member 196 is fixed with the steering arm 194, and is rigidly fixed with a cam member 198. The cam member 198 is pivotable about an axis 200 defined by the rod member 196. The cam member defines an arcuate slot 202 within which the end portion 204 of an elongate member 206 is received. The elongate member 206 extends rearwardly from the slot 202 in the cam member 198 and has a rearward end pivotally coupled with an arm 208 which is fixed with the steering control input 92 of the steering portion 50 of the transmission 46. When traveling in the forward direction, the elongate member 206 is positioned within the upper end portion 210 of the cam member's slot 202, as shown in FIG. 11. As the steering wheel 28 is turned by the operator the steering arm 194, rod member 196 and cam member 198 pivot about the cam axis 200 defined by the axis of the rod member 196 to a position such as is shown in FIG. 11. Pivoting of the cam member 198 causes the elongate member 206 to be pulled or pushed fore or aft generally along its longitudinal axis, which in turn causes the arm 208 to pivot and manipulate the steering control input 92. This causes the steering portion 50 to be engaged, which results in the execution of a vehicle turn. During vehicle travel in the reverse direction the front end portion 204 of the elongate member 206 is positioned in the lower end portion of the slot in the cam member 198. In this position the elongate member 206 is on the opposite side of the cam member's pivot axis 200, and so when the cam member 198 pivots as the steering wheel 28 is turned by the operator, the elongate member 206 will shift in the direction opposite to the direction that it would have shifted if the elongate member 206 were positioned in the upper end 20 of the slot 202.

The mechanism shown in FIGS. 7–11 also provides an actuating device 214 which serves to shift the forward end portion 204 of the elongate member 206 between its various locations within the slot 202 of the cam member 198. An actuating member 216 is operatively fixed with the underside of the forward pedal 40 which forms part of the foot pedal linkage. The actuating member 216 includes a slot or cam surface 218 against which a cam follower 220 abuts. The cam follower 220 is coupled with a lever member 222 pivotally supported by the vehicle 10. Coupled with the lever member 222 is a link 224 which is pivotally supported by a shifter member 226. The shifter member 226 is pivotally supported by the cam member 198, and includes a slot 228 within which the end portion 204 of the elongate member 206 is received. A biasing mechanism 230 which includes a torsion spring 232 is mounted with the shifter member 226 for biasing the shifter member 226 and elongate member 206 toward a neutral position with respect to the cam member 198 and slot 202, as shown in FIG. 9, which places the elongate member 206 generally directly aligned with the axis 200 of the cam member 198.

As shown in FIG. 11, a drive linkage 234 is provided that extends from the foot pedals 40, 42 rearwardly. The drive linkage 234 includes a rod member 236 having a rear end portion that engages an arm fixed with the drive portion control input shaft 66. The forward portion 238 of the rod member 236 is received within a slot 240 defined in the first arm 142 of the foot pedal system. A tension spring 242 extends between the first arm 142 and a portion of the rod member 236 for biasing the rod member 236 toward the rearward end of the slot 240.

Next, the operation of the reverse steering logic mechanism will be described in greater detail. When the operator is not depressing either foot pedal 40 or 42, the steering linkage 192 is in the configuration shown in FIG. 9. The forward end portion 204 of the elongate member 206 is positioned within the central portion 244 of the slot 202 of the cam member 198, and in general alignment with the pivot axis 200 of the cam member 198. If the operator were to turn the steering wheel 28 in this mode, the steering arm 194, rod member 196, and cam member 198 would pivot, but the elongate member 206 would not shift fore or aft since it is aligned with the pivot axis 200 of the cam member 198. This feature is advantageous in that an operator is prevented from steering the vehicle 10 while standing next to the vehicle 10. Without such a feature, an operator might stand next to the vehicle 10 and turn the steering wheel 28, which might cause the front of the vehicle 10 to begin to swing around to execute a spin turn.

When the operator begins forward travel he will depress the forward foot pedal 40, which will cause the first arm 142 to shift rearwardly until the drive rod 236 abuts the forward end of the slot 240, at which time the drive rod 236 begins to shift rearward to actuate the drive portion 48 and drive the wheels 24, 26 in a forward direction. The actuating member 216 swings rearwardly in response to the forward pedal 40 being pressed forwardly. This causes the cam follower 220 positioned within the slot 218 formed in the actuating member 216 to shift rearwardly in engagement with the intermediate portion 246 of the slot 218. This swings the lever 222 rearwardly, which pushes the link 224 rearwardly, which in turn causes the slotted front portion of the shifter member 226 to swing upwardly about its pivotal connection with the cam member. As the front portion of the shifter member 226 swings upwardly, the front end portion 204 of the elongate member 206 positioned within the shifter member slot 228 swings upwardly within the slot 202 in the cam member 198 until the upper end portion 210 of the cam member slot 202 is reached, as is shown in FIG. 11. This positions the elongate member 206 for shifting in the proper direction when the steering wheel 28 is turned by the operator. As the operator turns the steering wheel 28 in this mode, the steering arm 194, rod 196 and cam member 198 pivot about the axis 200 of the cam member 198. This causes the upper end of the cam member 198 to shift fore or aft corresponding to the direction the steering wheel 28 has been turned, which in turn shifts the elongate member 206 fore or aft with the upper end of the cam member 198. Shifting of the elongate rod 206 fore or aft pivots the arm 208 and steering control input 92 which causes the vehicle 10 to execute a turn.

When the operator wishes to travel in the reverse direction he will depress the reverse foot pedal 42. This causes the actuating member 216 to swing forwardly. The cam follower 220 will engage the cam surface 218 of the intermediate portion 246 of the slot 218, which will shift the cam follower 220 forwardly and upwardly. The lever 222 will shift forwardly with the cam follower 220, which in turn will pull the link 224 forwardly. This causes the slotted front portion of the shifter member 226 to pivot downwardly, which will press the forward portion 204 of the elongate member 206 downwardly to the lowermost end portion 212 of the slot 202 formed in the cam member 198. When the steering wheel 28 is turned in this reverse mode, the steering arm 194, rod 196 and cam member 198 will pivot about the axis 200 of the cam member 198, which will cause the lower portion of the cam member 198 to shift fore and aft. This causes the elongate member 206 to shift fore or aft and thereby manipulate the arm 208 and steering control input 92 of the steering portion 50 of the transmission 46 to execute a vehicle turn. But in this reverse mode of travel the elongate member 206 is on the opposite side of the cam member axis 200 that it was when in the forward mode. In the reverse mode the elongate member 206 is in the lower end 212 of the slot 202, and the elongate member 206 will shift in the opposite direction that it would shift if the elongate member 206 were positioned in the upper end 210 of the slot 202 when operating in the forward direction.

In other words, when the steering wheel 28 is turned to the right during forward travel, the steering linkage 192 will cause the cam member 198 to pivot counterclockwise as viewed in FIG. 9, causing the elongate member 206 in the upper portion 210 of the slot to shift aft, and the arm 208 and steering control input 92 to pivot counterclockwise. When the steering wheel 28 is turned to the right during vehicle travel in reverse, the steering linkage 192 will cause the cam member 198 to pivot counterclockwise, causing the elongate member 206 in the lower end 212 of the slot 202 to shift forwardly, and the arm 208 and steering control 92 input to pivot clockwise. Similarly, when the steering wheel 28 is turned to the left during forward vehicle travel, the steering linkage 192 will cause the cam member 198 to pivot clockwise, causing the elongate member 206 in the upper end 210 of the slot 202 to shift forwardly, and the arm 208 and steering control input 92 to pivot clockwise. When the steering wheel 28 is turned to the left during vehicle travel in reverse, the steering linkage 192 will cause the cam member 198 to pivot clockwise, causing the elongate member 206 in the lower end 212 of the slot 202 to shift aft, and the arm 208 and steering control input 92 to pivot counterclockwise.

The steering linkage 192 shown in FIGS. 7–11 therefore allows the vehicle 10 to be steered during reverse travel in a manner similar to how an automobile or conventionally steered lawn tractor steers in reverse. As the operator turns the steering wheel 28 to the right in either the forward or reverse direction of travel the vehicle 10 will turn to the seated operator's right side. As the operator turns the steering wheel 28 to the left in either the forward or reverse directions of travel the vehicle 10 will turn to the seated operator's left side.

A slot 240 is formed in the first arm 142 of the foot pedal linkage. This slot 240 establishes play in the drive linkage 234 that requires the forward foot pedal 40 to be depressed slightly before the drive portion 48 of the transmission 46 is engaged. As the forward foot pedal 40 is depressed through this initial range of motion the actuating linkage 214 is engaged and acts to shift the elongate member 206 upward to the upper end portion 210 of the slot 202 before the drive link 238 reaches the end of the slot 240 in the first arm 142. This means that in order to execute a spin turn when the vehicle 10 is stationary the operator will turn the steering wheel 28 in the desired direction of the spin turn, but since he has not yet depressed the forward foot pedal 40, the elongate member 206 is positioned in the central portion 244 of the slot 202 in the cam member 198, and therefore pivoting of the cam member 198 will not shift the elongate member 206. The vehicle 10 will therefore not begin to turn. The operator must also depress the forward pedal 40 to execute any turn. As he begins to depress the forward pedal 40 the actuating linkage 214 begins shifting the elongate member 206 toward the upper end 210 of the slot 202. As the elongate member 206 shifts upwardly away from the axis 200 of the cam member 198, the elongate member 206 will also shift rearwardly, which will cause the arm 208 and steering control input 92 to pivot and the vehicle 10 will begin executing a spin turn. The slot 240 in the first arm 142 allows the vehicle 10 to execute a spin turn as the operator depresses the forward pedal 40 without causing the vehicle 10 to be driven forward. If the operator continues to depress the forward pedal 40 further, then the drive link 238 will eventually abut the forward end of the slot 240 in the first arm 142, and the drive link 236 will begin shifting rearwardly, at which time the drive portion 48 of the transmission 46 will begin driving the vehicle 10 forwardly.

As best seen in FIG. 9, the pivot axis 200 of the cam member 198 is aligned generally directly in the center of the slot 202 of the cam member 198. If the cam axis 200 were offset fore or aft from its position shown in FIG. 9, the range of motion of the steering wheel 28 in one direction would be less than the range of motion in the other direction from a straight forward position. By positioning the cam member pivot axis 200 generally directly between the upper and lower end portions 210 and 212 of the cam member slot 202, and generally aligned with the central portion 244 of the slot 202, the steering wheel 28 is capable of being shifted through an equal range of motion in either direction from a neutral straight forward position. The cam member 198 is generally C-shaped as viewed from above, as best seen in FIG. 10, which allows a pivot axis 200 to be effectively established that is aligned with or generally intersects a portion of the slot 202.

What is claimed is:

1. A mechanism for steering a vehicle, comprising:

a vehicle power source, first and second ground engaging drive wheels positioned near the rear of the vehicle, at lease one pivotable ground engaging wheel positioned near the front of the vehicle, a transmission carried by the vehicle and including a driving portion and a steering portion, wherein the driving portion includes a power input from the vehicle power source, the driving portion being operative to transmit rotational motion from the vehicle power source to output shafts operatively coupled with the respective first and second drive wheels for propelling the vehicle across the ground surface, and the driving portion further includes a driving control input which controls the amount of rotational motion transmitted from the vehicle power source to the vehicle drive wheels, the driving control input being operatively engagable by an operator for altering the vehicle velocity and the forward or reverse direction of the vehicle, and said steering portion operatively engages the driving portion for affecting the amount of rotational motion transmitted to each drive wheel for executing vehicle turns, said steering portion includes a power input which receives power from the vehicle power source, and the steering portion includes a steering control input which controls the steering portion of the transmission, said steering portion being engaged with the driving portion for increasing the rotational speed of one drive wheel as the operator engages the steering control input, and the steering portion decreases the rotational speed of the other drive wheel for execution of a turn, a steering wheel operatively coupled with the steering control input and being pivotable by an operator to cause the steering portion to change the relative speeds of the first and second wheels, said steering wheel having a neutral position corresponding to straight vehicle travel, and said steering wheel is pivotable a maximum of between ninety and two-hundred-seventy degrees in either direction from said neutral position, a linkage operatively extending between the steering wheel and the steering portion of the transmission, said linkage comprising:
  a steering shaft operatively coupled with the steering wheel,
  a first lever operatively coupled with the steering shaft for pivoting in response to pivotal motion of the steering shaft,
  a link pivotally coupled with the first lever,
  a steering input control shaft coupled with the steering portion of the transmission and pivotable to control said steering portion, the steering input control shaft having a pivotal range of motion in both directions from a neutral position,
  a second lever fixed with the steering input control shaft and pivotally coupled with the link.

2. The mechanism of claim 1, wherein the linkage is adjustable to vary the maximum range of motion of the steering wheel corresponding to the range of motion of the steering input shaft.

3. The mechanism of claim 2, wherein the vehicle is a riding lawn tractor having a front mounted engine.

4. The mechanism of claim 1, wherein said link is selectively couplable to the first lever at a plurality of locations on the first lever to vary the maximum range of motion of the steering wheel corresponding to the range of motion of the steering input shaft.

5. The mechanism of claim 4, and further comprising a plurality of openings formed in the first lever for operatively coupling the link with the first lever, and the openings respectively correspond to ninety, one-hundred-thirty-five, and one-hundred-eighty maximum degrees of turn of the steering wheel from a neutral position.

6. A mechanism for steering a vehicle, comprising:
  a vehicle power source,
  first and second ground engaging drive wheels positioned near the rear of the vehicle,
  at lease one pivotable ground engaging wheel positioned near the front of the vehicle,
  a transmission carried by the vehicle and including a driving portion and a steering portion, wherein
    the driving portion includes a power input from the vehicle power source, the driving portion being operative to transmit rotational motion from the vehicle power source to output shafts operatively coupled with the respective first and second drive wheels for propelling the vehicle across the ground surface, and the driving portion further includes a driving control input which controls the amount of rotational motion transmitted from the vehicle power source to the vehicle drive wheels, the driving control input being operatively engagable by an operator for altering the vehicle velocity and the forward or reverse direction of the vehicle, and
    said steering portion operatively engages the driving portion for affecting the amount of rotational motion transmitted to each drive wheel for executing vehicle turns, said steering portion includes a power input which receives power from the vehicle power source, and the steering portion includes a steering control input which controls the steering portion of the transmission, said steering portion being engaged with the driving portion for increasing the rotational speed of one drive wheel as the operator engages the steering control input, and the steering portion decreases the rotational speed of the other drive wheel for execution of a turn,
  a steering wheel operatively coupled with the steering control input and being pivotable by an operator to cause the steering portion to change the relative speeds of the first and second wheels, said steering wheel having a neutral position corresponding to straight vehicle travel, and said steering wheel is pivotable a maximum of one-hundred-thirty-five degrees in either direction from said neutral position,
  a linkage operatively extending between the steering wheel and the steering portion of the transmission, said linkage comprising:
    a steering shaft operatively coupled with the steering wheel,
    a first lever operatively coupled with the steering shaft for pivoting in response to pivotal motion of the steering shaft,
    a link pivotally coupled with the first lever,
    a steering input control shaft coupled with the steering portion of the transmission and pivotable to control said steering portion, the steering input control shaft having a pivotal range of motion in both directions from a neutral position,
    a second lever fixed with the steering input control shaft and pivotally coupled with the link.

7. A mechanism for steering a vehicle, comprising:
  a vehicle power source,
  first and second ground engaging drive wheel positioned near the rear of the vehicle,
  at lease one pivotable ground engaging wheel positioned near the front of the vehicle,
  a transmission carried by the vehicle and including a driving portion and a steering portion, wherein
    the driving portion includes a power input from the vehicle power source, the driving portion being operative to transmit rotational motion from the vehicle power source to output shafts operatively coupled with the respective first and second drive wheels for propelling the vehicle across the ground surface, and the driving portion further includes a driving control input which controls the amount of rotational motion transmitted from the vehicle power source to the vehicle drive wheels, the driving control input being operatively engagable by an operator for altering the vehicle velocity and the forward or reverse direction of the vehicle, and
    said steering portion operatively engages the driving portion for affecting the amount of rotational motion transmitted to each drive wheel for executing vehicle turns, said steering portion includes a power input which receives power from the vehicle power source, and the steering portion includes a steering control input which controls the steering portion of the transmission, said steering portion being engaged with the driving portion for increasing the rotational speed of one drive wheel as the operator engages the steering control input, and the steering portion decreases the rotational speed of the other drive wheel for execution of a turn,
  a steering wheel operatively coupled with the steering control input and being pivotable by an operator to cause the steering portion to change the relative speeds of the first and second wheels, said steering wheel having a neutral position corresponding to straight vehicle travel, and said steering wheel is pivotable a maximum of ninety degrees in either direction from said neutral position, a linkage operatively extending between the steering wheel and the steering portion of the transmission, said linkage comprising:
  a steering shaft operatively coupled with the steering wheel,
  a first lever operatively coupled with the steering shaft for pivoting in response to pivotal motion of the steering shaft,
  a link pivotally coupled with the first lever,
  a steering input control shaft coupled with the steering portion of the transmission and pivotable to control said steering portion, the steering input control shaft having a pivotal range of motion in both directions from a neutral position,
  a second lever fixed with the steering input control shaft and pivotally coupled with the link.

8. A mechanism for steering a vehicle, comprising:

a vehicle power source, first and second ground engaging drive wheels positioned near the rear of the vehicle, at lease one pivotable ground engaging wheel positioned near the front of the vehicle, a transmission carried by the vehicle and including a driving portion and a steering portion, wherein
  the driving portion includes a power input from the vehicle power source, the driving portion being operative to transmit rotational motion from the vehicle power source to output shafts operatively coupled with the respective first and second drive wheels for propelling the vehicle across the ground surface, and the driving portion further includes a driving control input which controls the amount of rotational motion transmitted from the vehicle power source to the vehicle drive wheels, the driving control input being operatively engagable by an operator for altering the vehicle velocity and the forward or reverse direction of the vehicle, and
  said steering portion operatively engages the driving portion for affecting the amount of rotational motion transmitted to each drive wheel for executing vehicle turns, said steering portion includes a power input which receives power from the vehicle power source, and the steering portion includes a steering control input which controls the steering portion of the transmission, said steering portion being engaged with the driving portion for increasing the rotational speed of one drive wheel as the operator engages the steering control input, and the steering portion decreases the rotational speed of the other drive wheel for execution of a turn, a steering wheel operatively coupled with the steering control input and being pivotable by an operator to cause the steering portion to change the relative speeds of the first and second wheels, said steering wheel having a neutral position corresponding to straight vehicle travel, and said steering wheel is pivotable a maximum of one-hundred-eighty degrees in either direction from said neutral position, a linkage operatively extending between the steering wheel and the steering portion of the transmission, said linkage comprising:
  a steering shaft operatively coupled with the steering wheel,
  a first lever operatively coupled with the steering shaft for pivoting in response to pivotal motion of the steering shaft,
  a link pivotally coupled with the first lever,
  a steering input control shaft coupled with the steering portion of the transmission and pivotable to control said steering portion, the steering input control shaft having a pivotal range of motion in both directions from a neutral position,
  a second lever fixed with the steering input control shaft and pivotally coupled with the link.

9. A mechanism for steering a vehicle, comprising:

a vehicle power source, first and second ground engaging drive wheels positioned near the rear of the vehicle, at least one pivotable ground engaging wheel positioned near the front of the vehicle, a transmission carried by the vehicle and including a driving portion and a steering portion, wherein
  the driving portion includes a power input from the vehicle power source, the driving portion being operative to transmit rotational motion from the vehicle power source to output shafts operatively coupled with the respective first and second drive wheels for propelling the vehicle across the ground surface, and the driving portion further includes a driving control input which controls the amount of rotational motion transmitted from the vehicle power source to the vehicle drive wheels, the driving control input being operatively engagable by an operator for altering the vehicle velocity and the forward or reverse direction of the vehicle, and
  said steering portion operatively engages the driving portion for affecting the amount of rotational motion transmitted to each drive wheel for executing vehicle turns, said steering portion includes a power input which receives power from the vehicle power source, and the steering portion includes a steering control input which controls the steering portion of the transmission, said steering portion being engaged with the driving portion for increasing the rotational speed of one drive wheel as the operator engages the steering control input, and the steering portion decreases the rotational speed of the other drive wheel for execution of a turn, a steering wheel operatively coupled with the steering control input and being pivotable by an operator to cause the steering portion to change the relative speeds of the first and second wheels, said steering wheel having a neutral position corresponding to straight vehicle travel, and said steering wheel is pivotable within a maximum range of motion in either direction from said neutral position, a linkage operatively extending between the steering wheel and the steering portion of the transmission, and the linkage is adjustable to vary the maximum range of motion of the steering wheel corresponding to the range of motion of the steering control input, said linkage further comprises:
  a steering shaft operatively coupled with the steering wheel,
  a first lever operatively coupled with the steering shaft for pivoting in response to pivotal motion of the steering shaft, a link pivotally coupled with the first lever, a steering input control shaft coupled with the steering portion of the transmission and pivotable to control said steering portion, the steering input control shaft having a pivotal range of motion in both directions from a neutral position, a second lever fixed with the steering input control shaft and pivotally coupled with the link.

10. The mechanism of claim 9, wherein said link is selectively couplable to the first lever at a plurality of locations on the first lever to vary the maximum range of motion of the steering wheel corresponding to the range of motion of the steering input shaft.

11. The mechanism of claim 9, wherein the vehicle is a riding lawn tractor having a front mounted engine.

12. The mechanism of claim 10, wherein the vehicle is a riding lawn tractor having a front mounted engine.

* * * * *